US005940136A

United States Patent [19]

Abe et al.

[11] Patent Number: 5,940,136

[45] Date of Patent: Aug. 17, 1999

[54] DOT CLOCK REPRODUCING METHOD AND DOT CLOCK REPRODUCING APPARATUS USING THE SAME

[75] Inventors: Hideki Abe; Noriyuki Iwakura; Takahisa Hatano; Yoshikuni Shindo; Kazuhiro Yamada; Kazushige Kida; Kazunari Yamaguchi, all of Sapporo, Japan

[73] Assignee: Matsushita Electric Industrial Co., Ltd., Osaka, Japan

[21] Appl. No.: 08/852,189

[22] Filed: May 6, 1997

[51] Int. Cl.$^6$ ........................................................ H04N 5/04

[52] U.S. Cl. .......................... 348/537; 348/536; 348/541; 348/544; 348/500; 345/212; 345/213

[58] Field of Search .................................... 348/537, 536, 348/540, 541, 542, 543, 544, 545, 546, 500; 324/76.39; 345/212, 213; H04N 5/04, 5/05

[56] References Cited

U.S. PATENT DOCUMENTS

| | | | |
|---|---|---|---|
| 4,291,332 | 9/1981 | Kato et al. | 358/19 |
| 4,626,912 | 12/1986 | Wilkinson | 358/141 |
| 4,774,577 | 9/1988 | Takimoto | 358/148 |
| 4,780,759 | 10/1988 | Matsushima et al. | 358/148 |
| 4,794,626 | 12/1988 | Tanabe et al. | 375/110 |
| 4,893,319 | 1/1990 | Ziuchkovski | 375/111 |
| 4,942,370 | 7/1990 | Shigemori | 331/14 |
| 4,998,169 | 3/1991 | Yoshioka | 358/148 |
| 5,168,360 | 12/1992 | Maeshima | 358/148 |
| 5,227,882 | 7/1993 | Kato | 358/160 |
| 5,243,412 | 9/1993 | Goukura et al. | 358/19 |
| 5,479,073 | 12/1995 | Mamiya et al. | 348/500 |
| 5,528,307 | 6/1996 | Owada et al. | 348/537 |
| 5,539,473 | 7/1996 | Kommrusch et al. | 348/537 |
| 5,541,646 | 7/1996 | Huang | 348/177 |
| 5,546,032 | 8/1996 | Yatagai | 327/165 |
| 5,548,249 | 8/1996 | Sumita et al. | 331/1 A |
| 5,568,201 | 10/1996 | Matsumoto | 348/537 |
| 5,596,372 | 1/1997 | Berman et al. | 348/537 |
| 5,680,178 | 10/1997 | Takeuchi | 348/500 |
| 5,686,968 | 11/1997 | Ujiie et al. | 348/537 |
| 5,706,035 | 1/1998 | Tsunoda et al. | 345/213 |
| 5,731,843 | 3/1998 | Cappels, Sr. | 348/537 |

FOREIGN PATENT DOCUMENTS

| | | |
|---|---|---|
| 05066752 | 3/1993 | Japan . |
| 05276038 | 10/1993 | Japan . |
| 06046374 | 2/1994 | Japan . |
| 07181943 | 7/1995 | Japan . |
| 7-306668 | 11/1995 | Japan . |
| WO93/15497 | 8/1993 | WIPO . |

OTHER PUBLICATIONS

European Search Report dated Sep. 24, 1997, EP 97 10 7477.

*Primary Examiner*—John K. Peng
*Assistant Examiner*—Jean W. Désir
*Attorney, Agent, or Firm*—Ratner & Prestia

[57] ABSTRACT

The invention presents a dot clock reproducing apparatus for automatically reproducing the dot clock easily, by setting the dot clock frequency of a video signal source, and correcting the phase difference of the dot clock occurring in the transmission route or the like, and also presents a dot clock reproducing method comprising, in dot clock reproduction, a step of sampling at a frequency different from the dot clock of video signal, a step of detecting the aliasing frequency component occurring at this time, and a step of reproducing the dot clock so as not to cause this aliasing frequency component, and as an apparatus employing such method, the invention further provides a dot clock reproducing apparatus comprising A/D converting means for receiving an adjusting signal delivered from a video signal source, and sampling this adjusting signal to convert into a digital signal, PLL means for dividing a specified synchronizing signal and generating a sampling clock for the A/D converting means, frequency analyzing means for analyzing the frequency of the adjusting signal from the output of the A/D converting means, and dividing ratio setting means for controlling the dividing ratio of the PLL means from the output of the frequency analyzing means, wherein the dot clock is reproduced so that the output of the PLL means may be used as the dot clock signal, thereby realizing a dot clock reproducing apparatus for reproducing automatically the dot clock easily, by setting the dot clock frequency of the video signal source, and correcting the phase difference of the dot clock occurring in the transmission route or the like.

26 Claims, 22 Drawing Sheets

DOT CLOCK REPRODUCING METHOD AND DOT CLOCK REPRODUCING APPARATUS USING THE SAME

FIELD OF THE INVENTION

The present invention relates to a dot clock generating apparatus used as synchronizing signal of an image display device, and more particularly to liquid crystal such as matrix display device scanning converting device connected to a computer (IBM PC, etc.) in which dot clock of video signal is not delivered.

BACKGROUND OF THE INVENTION

A video signal delivered from a personal computer or EWS (engineering work station) is changed in signal level in a specific period (hereinafter called "dot period") shorter than a horizontal synchronizing signal, and in the case of display in liquid crystal such as matrix display device, or in the case of signal processing by writing into a memory, a clock coinciding with the dot period (hereinafter called dot clock) is needed as a synchronizing signal.

Few personal computers, however, deliver dot clock, and therefore when displaying a video signal delivered from a personal computer, the image display device has a dot clock reproducing apparatus for reproducing the dot clock by multiplying the horizontal synchronizing signal.

For the conventional dot clock reproducing apparatus, however, various adjustments are indispensable, owing to the necessity of reproducing dot clock frequency of varied video signal sources from numerous personal computers, and the necessity of completely reproducing and restoring phase deviation between horizontal synchronizing signal and video signal due to the difference in the transmission route even in same video signal source. More specifically, the user must adjust manually by connecting a video signal source to the image display device, displaying the image of finer vertical lines than in the personal computer, and adjusting the multiplying factor of the PLL circuit of the dot clock reproducing apparatus, so that the vertical lines may be observed clearly.

This adjustment was disclosed as an example of automatic reproduction of a dot clock in Japanese Laid-open Patent 5-66752.

FIG. 26 shows a constitution of a conventional dot clock reproducing apparatus, in which reference 21 is an edge detector of video signal changing in dot period, 22 is a period measuring unit for measuring the period by counting high frequency pulses generated by a pulse oscillator 23 between an output edge of the edge detector and an edge of horizontal synchronizing signal, 23 is a pulse generator for generating a high frequency pulse used in period measurement in the period measuring unit, and 24 is an operation unit for setting the frequency of sampling clock to be created in a PLL circuit 25 by calculating the output of the period measuring unit.

In this constitution, however, in the case of XGA (Extended Graphic Array), since the dot clock frequency is very high, from 60 MHz to 80 MHz, the output in the pulse generator oscillated for measurement of period is required to be a still higher frequency, and the circuit for composing the period measuring unit requires parts of high performance corresponding to the very high frequency, and hence the cost is heightened.

SUMMARY OF THE INVENTION

It is an object of the invention to present a dot clock reproducing apparatus for reproducing automatically a dot clock by setting the dot clock frequency of video signal source, and correcting the phase difference of the dot clock occurring in the transmission route, or the like.

A method of reproducing a dot clock comprises, in dot clock reproduction, a step of sampling at a frequency different from the dot clock of video signal, a step of detecting the aliasing frequency component occurring at this time, and a step of reproducing the dot clock so as not to cause this aliasing frequency component, wherein the dot clock frequency is corrected and adjusted, and sequential correction is repeated until the aliasing frequency component is eliminated, so that an accurate dot clock frequency can be reproduced.

In particular, it further comprises a step of the dividing the detection of aliasing frequency component of one frame into plural regions, so that it is applicable to dot clock of high frequency.

It also provides a dot clock reproducing method comprising a step of sampling the video signal source for delivering an adjusting signal, a step of differentiating the signal after sampling, and a step of adjusting automatically the phase of the dot clock to be reproduced, wherein the number of bits smaller than the number of bits of the signal to be displayed as image is differentiated, and therefore by intentionally decreasing the number of bits into the differentiating circuit than the number of bits of the signal actually displayed on the screen, the dot clock frequency can be reproduced without effect of the noise in the analog stage included in the video signal.

Moreover, it provides a dot clock reproducing method comprising a step of changing the phase of the dot clock, instead of using the video signal source for delivering an adjusting signal, a step of detecting the differential of the sampling values of each phase, and a step of determining the optimum clock phase on the basis of the result differentiating about the signal, wherein the input video signal is sampled by a clock at a constant frequency, the sampling data of one frame is accumulated and added, the standard deviation of the sum of several frames is determined, and the phase of the dot clock and input video signal is adjusted so as to reduce the deviation.

An apparatus employing such dot clock reproducing method is provided as a dot clock reproducing apparatus comprising A/D converting means for receiving an adjusting signal delivered from a video signal source, and sampling this adjusting signal to convert into a digital signal, PLL means for dividing a specified synchronizing signal and generating a sampling clock for the A/D converting means, frequency analyzing means for analyzing the frequency of the adjusting signal from the output of the A/D converting means, and dividing ratio setting means for controlling the dividing ratio of the PLL means from the output of the frequency analyzing means, wherein the dot clock is reproduced so that the output of the PLL means may be used as the dot clock signal, thereby realizing a dot clock reproducing apparatus for reproducing automatically the dot clock easily, by setting the dot clock frequency of the video signal source, and correcting the phase difference of the dot clock occurring in the transmission route or the like.

It also provides a dot clock reproducing apparatus comprising A/D converting means for receiving a video signal delivered from a video signal source, and sampling this video signal to convert into a digital signal, PLL mans for dividing a specified synchronizing signal and generating a sampling clock for the A/D converting means, signal level difference detecting means for determining the difference between specified samples according to the output of the A/D converting means, accumulating means for determining the absolute value of the output of the signal level difference detecting means, sequentially accumulating the absolute values, and delivering the result of accumulation, and phase adjusting means for controlling the phase of the sampling clock of the PLL means from the output of the accumulating means, wherein the dot clock is reproduced so that the output of the PLL means may be used as the dot clock signal, thereby realizing a dot clock reproducing apparatus for reproducing automatically the dot clock easily, by detecting the signal level difference, and adjusting the phase of the sampling clock by this detected signal.

BRIEF DESCRIPTION OF THE DRAWINGS

FIG. 2(*b*) is a diagram showing a magnified portion of the waveform of FIG. 2(*a*).

FIG. 5(*b*) is a sampling timing explanatory diagram when the frequency is same.

FIG. 8(*b*) is a sampling explanatory diagram when the frequency is same.

FIG. 18(*b*) is a magnified waveform diagram overlaying video signals in the vertical direction.

FIG. 20(*b*) is a magnified waveform diagram overlaying video signals in the frame direction.

DESCRIPTION OF THE PREFERRED EMBODIMENTS

Figure 1:
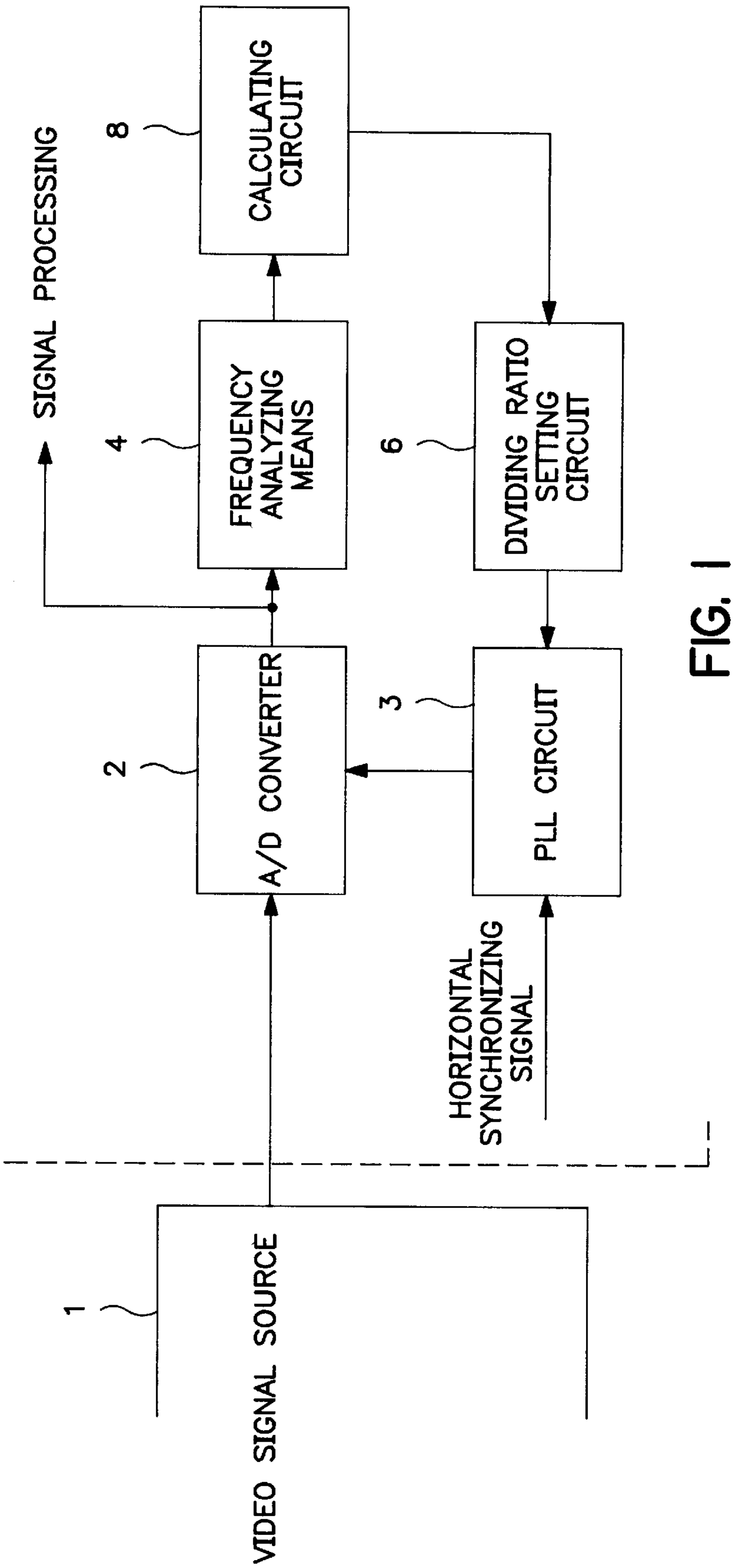
FIG. 1 is a block diagram of a dot clock reproducing apparatus according to embodiment 1 of the invention.

Referring now to the drawings, preferred embodiments of the invention are described in detail below.

(Embodiment 1)

FIG. 1 is a block diagram of a dot clock reproducing apparatus in a first embodiment of the invention.

Figure 2A:
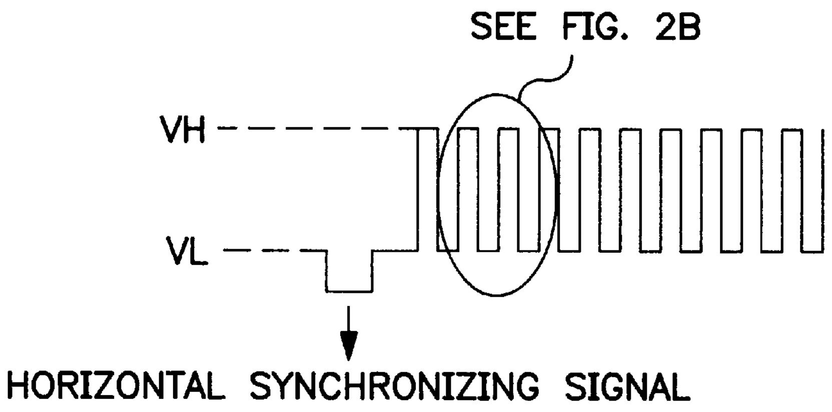
FIG. 2(*a*) is a diagram showing an example of video signal waveform for adjustment delivered from a video signal source.
Figure 2B:
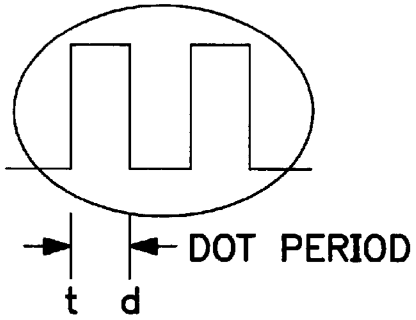

In FIG. 1, reference numeral 1 is a video signal source such as a computer, which delivers a video signal for adjustment as shown in FIG. 2(*a*) and FIG. 2(*b*). Reference numeral 2 is an A/D converter for sampling the entered video signal according to a dot clock delivered from a PLL circuit 3, described below, to convert into a digital signal. Reference numeral 3 is a PLL circuit for creating a sampling clock synchronized with a horizontal synchronizing signal, and 4 is a frequency analyzing means for analyzing the aliasing frequency component produced when sampling the dot clock of the input video signal source by the clock delivered from the PLL circuit 3.

Figure 3:
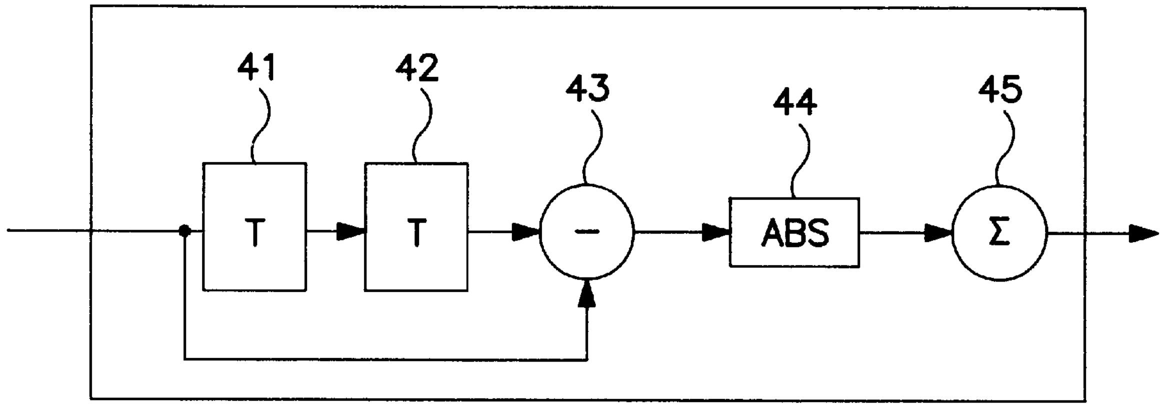
FIG. 3 is a block diagram of an example of frequency analyzing means.

Herein, an example of the frequency analyzing means 4 for the output signal for adjustment in FIG. 2(*a*) is composed of two delay circuits 41, 42, a subtractor 43, an absolute value circuit 44, and a first accumulator 45 as shown in FIG. 3.

In FIG. 1, further, reference numeral 6 is a dividing ratio setting circuit for setting the frequency of sampling clock for PLL, and 8 is a calculating circuit for calculating and delivering a frequency variable amount of sampling clock for the dividing ratio setting circuit 6 on the basis of the information of the aliasing frequency component obtained from the frequency analyzing means 4.

Figure 4:
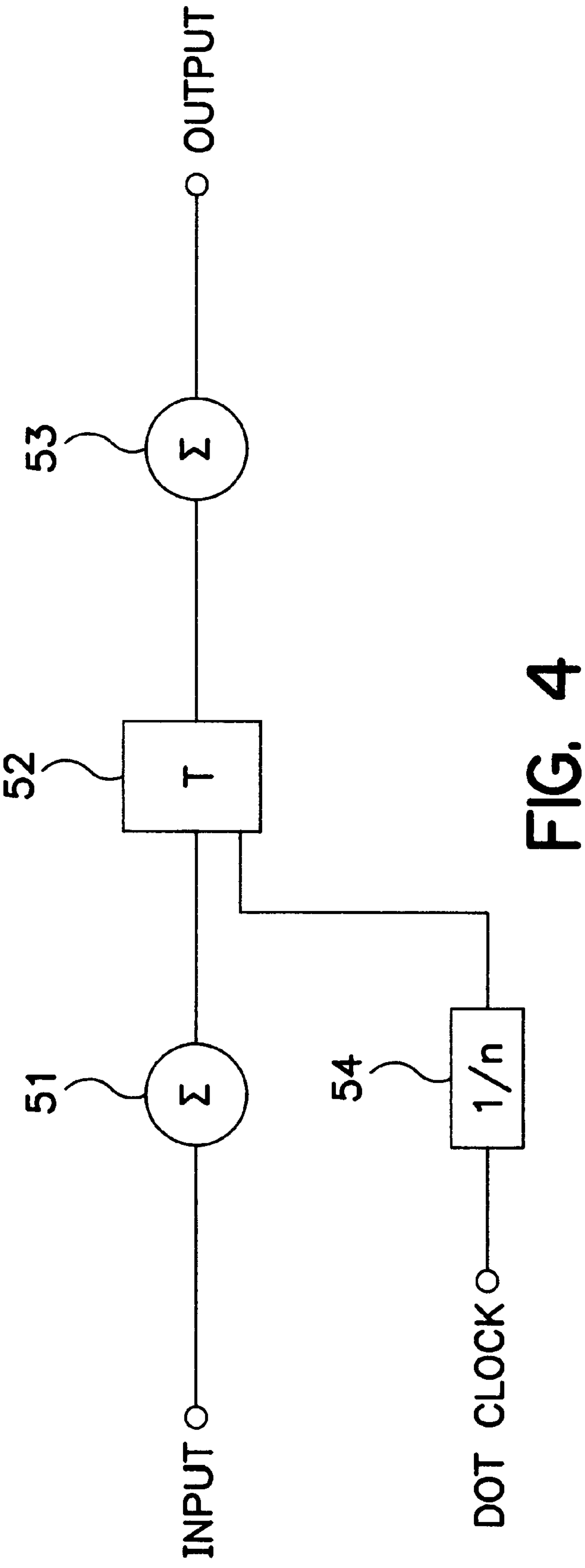
FIG. 4. is an internal structure of an example of an accumulator.

FIG. 4 is an internal structural diagram of the accumulator 45, and in FIG. 4, specifically, reference numeral 51 is a second accumulator for accumulating input signals to the accumulator 45 in synchronism with the dot clock, 52 is a delay circuit, 53 is a third accumulator for accumulating the outputs of the delay circuit 52, and 54 is a frequency divider for dividing the dot clock into 1/n frequency.

In thus constituted dot clock reproducing circuit of the embodiment, the operation is described below. The output signal for adjustment in FIG. 2(*a*) delivered from the video signal source 1 is a signal repeating VH and VL signals in every other dot.

In the circuit of example of the frequency analyzing means 4 shown in FIG. 3, about the results of sampling by the A/D converter 2, the difference of sampling values of every other sample is determined, and the absolute value of the variation amount between two samples is calculated and accumulated. As a result, when the sampling frequency is equal to the dot clock frequency of the video signal source 1, the variation amount between two samples becomes 0 as shown in FIG. 5(*b*), and the output of the frequency analyzing means 4 becomes 0 (may not become 0 due to noise or other factor).

Figure 5A:
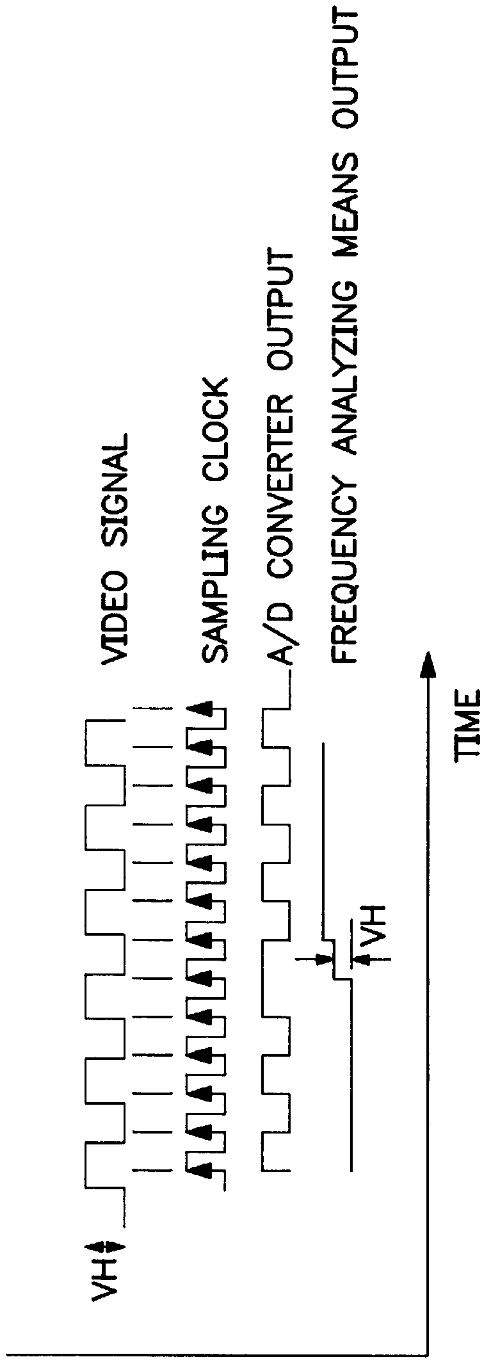
FIG. 5(*a*) is a sampling timing explanatory diagram when the frequency is different.
Figure 5B:
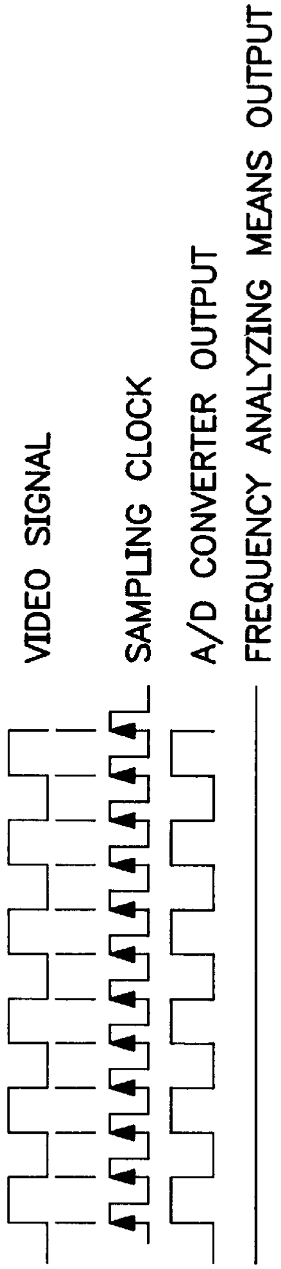

If the frequency is different, the variation amount of two samples of every other sample is present as shown in FIG. 5(*a*), and the aliasing portion of two clock frequencies appears as the variation amount, and when accumulated, the output of the frequency analyzing means 4 becomes very large as compared with 0. The output of this frequency analyzing means 4 is smaller when the difference of the dot clock frequency of the video signal source 1 and sampling frequency is smaller.

It is thus possible to detect whether the dot clock frequency of the video signal source 1 and the sampling frequency of the A/D converter 2 are matched or not, and by using the result of this detection, the sampling frequency can be adjusted by the dividing ratio setting circuit 6 through the calculating circuit 8.

In the accumulator 45 in this constitution, for example, when quantized in 8 bits by the A/D converter 2, in the case of the signal having the number of effective pixels per frame of 1280×1024 dots, the accumulation of 9×11×10=30 bits must be done in one dot clock, and the accumulator is required to operate at high speed.

However, as shown in FIG. 4, by dividing the inside of the accumulator 45 into n divisions, the number of bits of the accumulator 51 in which high speed operation is requested can be decreased, and by increasing the number of bits of the accumulator 53 for operating at 1/n of dot clock, it is possible to compose the accumulator 45 operating at high speed on the whole, so that it is applicable to high dot clock.

Thus, according to the embodiment, detecting the aliasing frequency component produced when sampling, this detection signal is calculated, and the dot clock frequency is corrected and adjusted, and the dot clock frequency is reproduced by sequentially repeating until the aliasing frequency component is eliminated.

Moreover, delivering an adjusting signal from the video signal source, the aliasing frequency component produced when A/D converting (sampling) this signal at the clock not coinciding with the dot clock frequency is detected, this detection signal is calculated, and the dot clock frequency is corrected and adjusted, and the dot clock frequency is reproduced by sequentially repeating until the aliasing frequency component is eliminated.

In the explanation herein, the sample hold means is composed of A/D converter 2, but other sample hold means may be also applicable.

(Embodiment 2)

Figure 6:
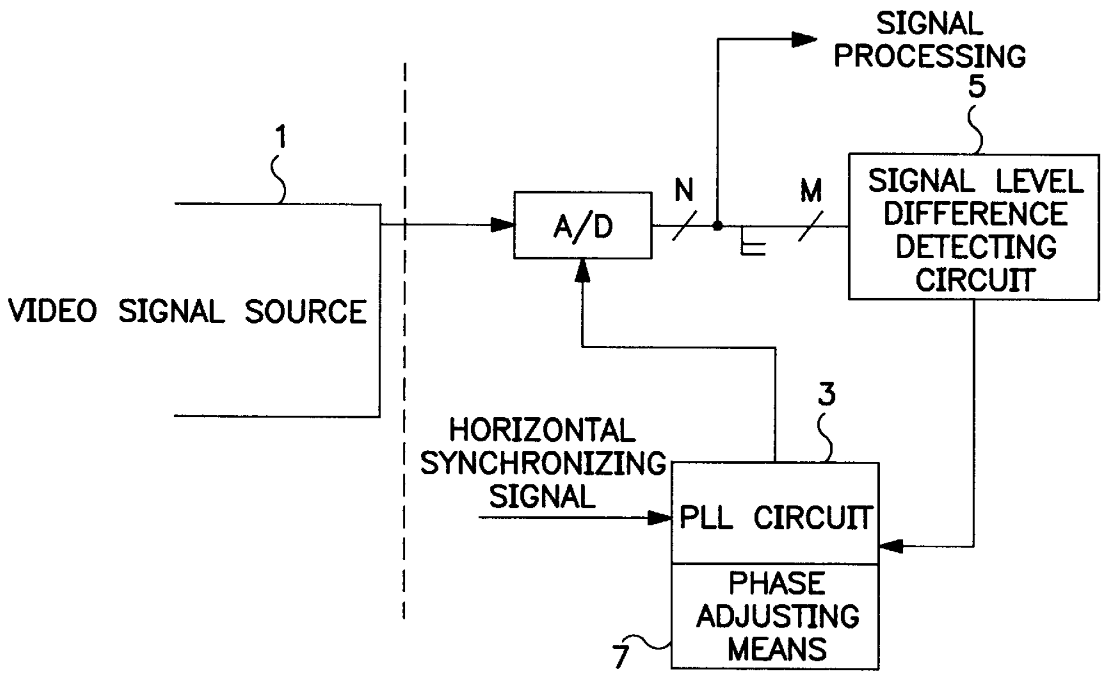
FIG. 6 is a block diagram of a dot clock reproducing apparatus according to embodiment 2 of the invention.
Figure 7:
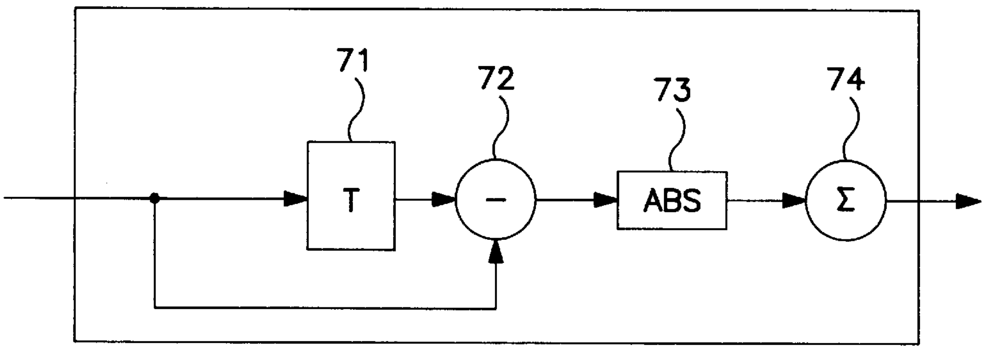
FIG. 7 is a block diagram of an example of level difference detecting means.

Other embodiment of the invention is described by referring to FIG. 6 and FIG. 7. Same components as in the foregoing embodiment are identified with same reference numerals, and descriptions are omitted.

FIG. 6 shows a dot clock reproducing apparatus according to a second embodiment, in which reference numeral 5 is a signal level detecting means for detecting the level difference in one dot sample, and it is composed of a delay circuit 71, a subtractor 72, an absolute value circuit 73, and an accumulator 74 as shown in FIG. 7 as an example of the signal level difference detecting circuit 5 for the output signal for adjustment in FIG. 2.

In FIG. 6, moreover, reference numeral 7 is a phase adjusting means for adjusting the phase of the output of the PLL circuit 3, and the phase adjustment value is determined by the output of the signal level difference detecting circuit 5.

In thus constituted dot clock reproducing apparatus of the embodiment, the operation is described below.

Herein, in the circuit of example of the signal level detecting circuit 5 shown in FIG. 7, about the results of sampling by the A/D converter 2, the sampling value difference between adjacent samples is determined, and the absolute value of the variation amount of adjacent samples is calculated and accumulated. As a result, when the sampling and output phase of the video signal source 1 are matched, the variation amount between adjacent samples is VH−VL=X as shown in FIG. 8(*b*), which is maximum being equal to the amplitude X in the adjusting signal in FIG. 2.

Figure 8A:
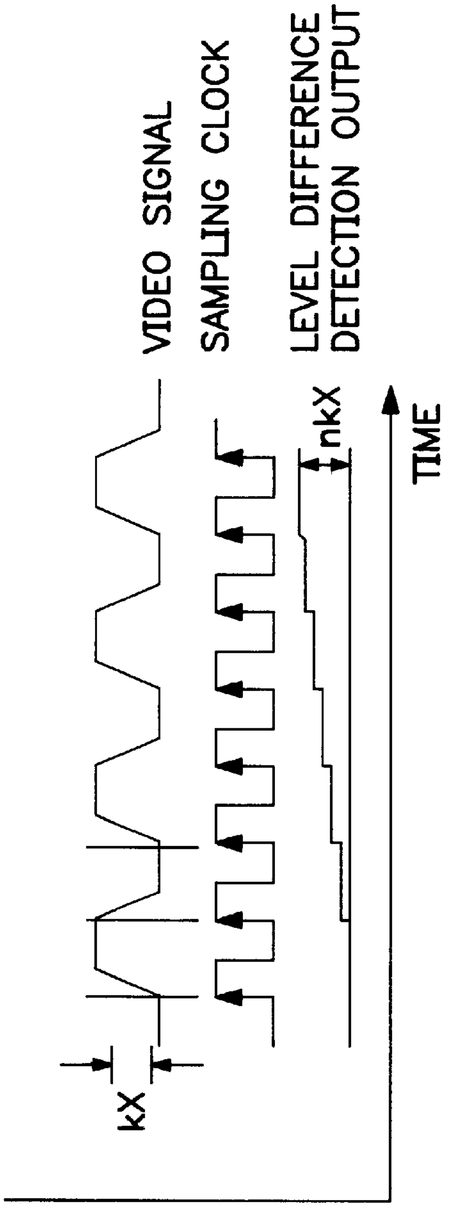
FIG. 8(*a*) is a sampling explanatory diagram when the frequency is different.
Figure 8B:
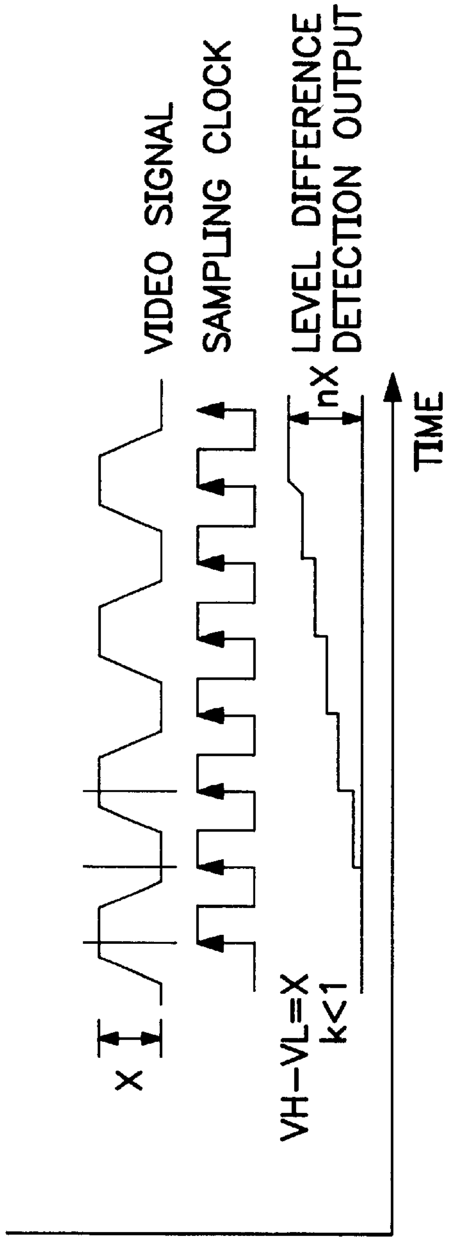

If the phases are not matched, the variation amount of adjacent sample values is smaller than the amplitude of the video signal for adjustment as shown in FIG. 8(*a*). Accordingly, in order that the result of accumulating the variation amounts may be maximum, the phase adjusting means 7 can adjust the phase of the output signal of the video signal source 1 and the sampling clock delivered by the PLL circuit 3.

Figure 9:
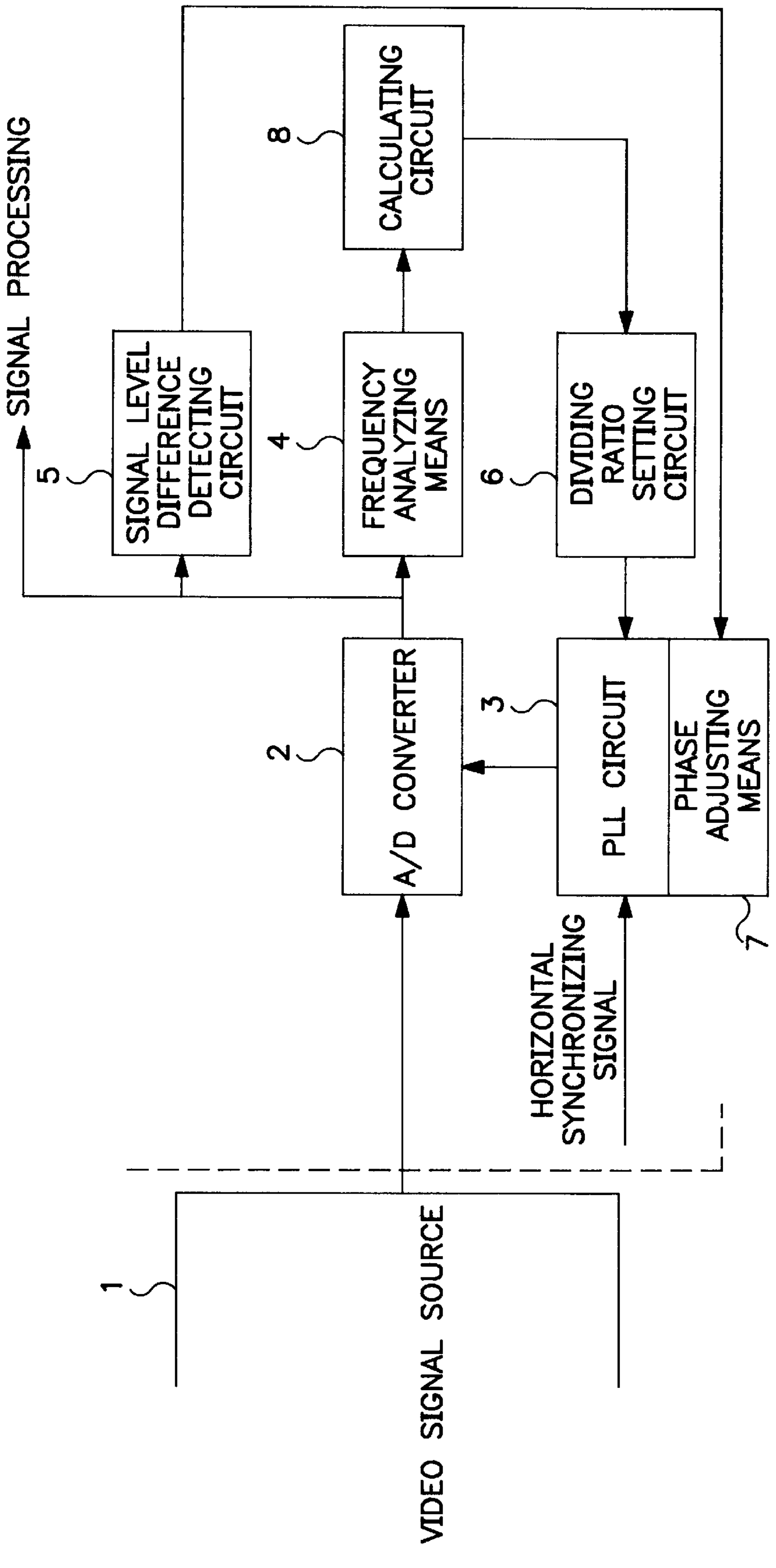
FIG. 9 is a block diagram of the dot clock reproducing apparatus according to embodiment 2 of the invention.

This is the description of the operation in the state of matching of the dot clock frequency, but, alternatively, the dot clock frequency may be adjusted as shown in embodiment 1, and embodiments 1 and 2 may be combined as shown in FIG. 9.

More specifically, the input signal is quantized into N bits in the A/D converter 2, and N bits are directly delivered to signal processing for processing of display image, and M bits, smaller than N bits, are delivered to the signal level detecting means 5. The number of bits is decreased in order to avoid effects of noise at the analog stage. That is, if noise in analog stage is included in the A/D converged signal, the noise component is stacked up for one frame by the accumulator 74 inside the signal level detecting means 5 in a later stage.

Hence, in the input to the signal level detecting means 5, the lower bits of the digitized signal including the noise component are discarded. Thus, the noise effect is avoided.

In this way, according to the embodiment, using the video signal source for delivering an adjusting signal, when automatically adjusting the phase of the dot clock to be reproduced by using the result of differentiating the signal after sampling (calculating the differential between pixels adjacent in time and in space), it is a feature to differentiate the number of bits smaller than the number of bits of the signal displayed as image, and by intentionally decreasing the number of bits to the differentiating circuit than the number of bits of the signal actually displayed in the image, the dot clock frequency is reproduced without having effects of noise in the analog stage included in the video signal.

That is, as for the adjusting signal of which signal level difference between dots is maximum, the signal level difference between dots (between samples) between sampled video signals is detected, and the phase of the sampling clock is adjusted by this detected signal, and the phase adjustment is repeated sequentially until this detection signal reaches the maximum, thereby correcting the phase of the sampling clock.

(Embodiment 3)

Figure 10:
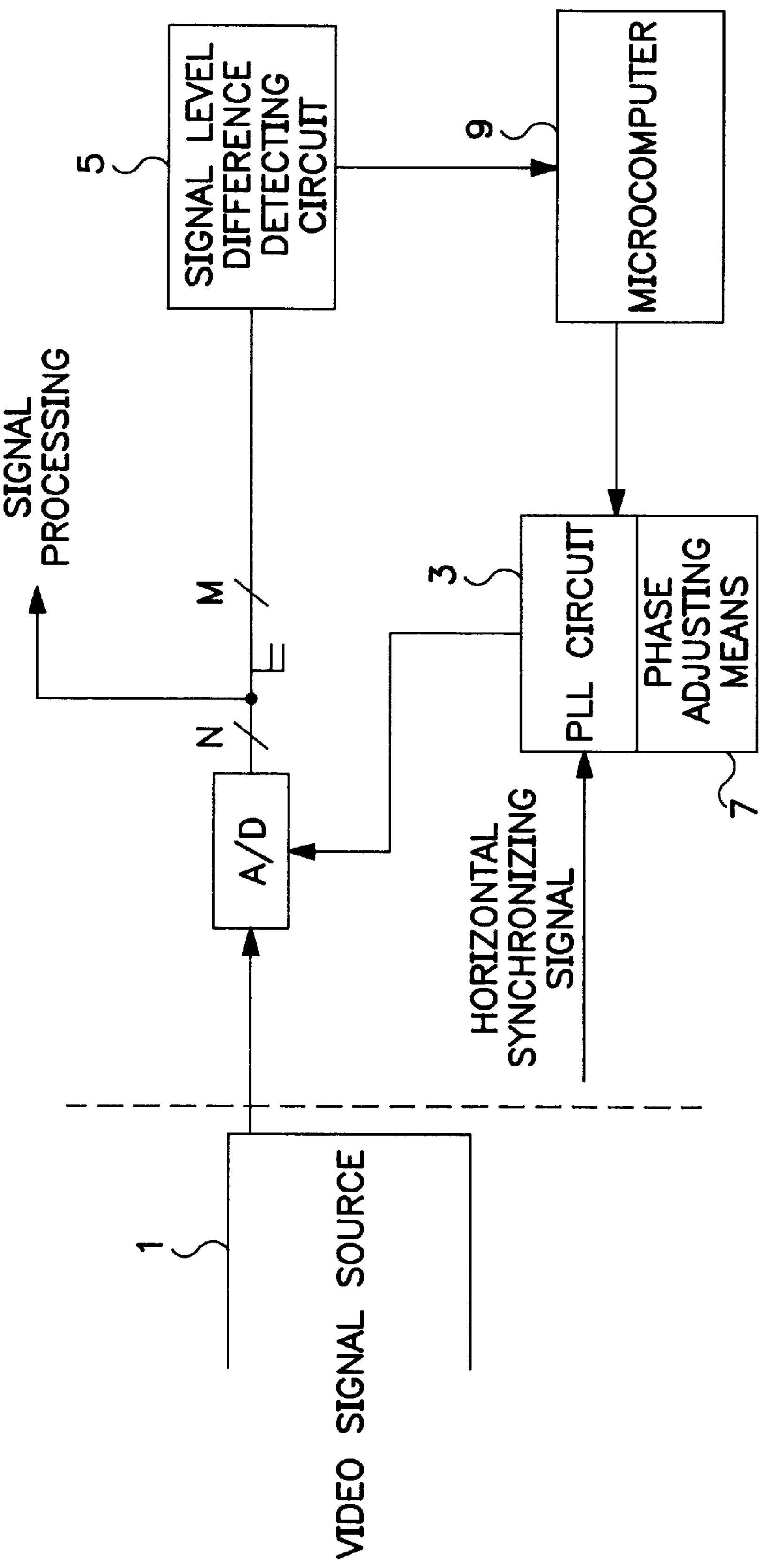
FIG. 10 is a block diagram of embodiment 3 of the invention.

FIG. 10 shows a dot clock reproducing apparatus in a third embodiment, and same components as in the foregoing embodiments are identified with same reference numerals, and descriptions are omitted.

Figure 11:
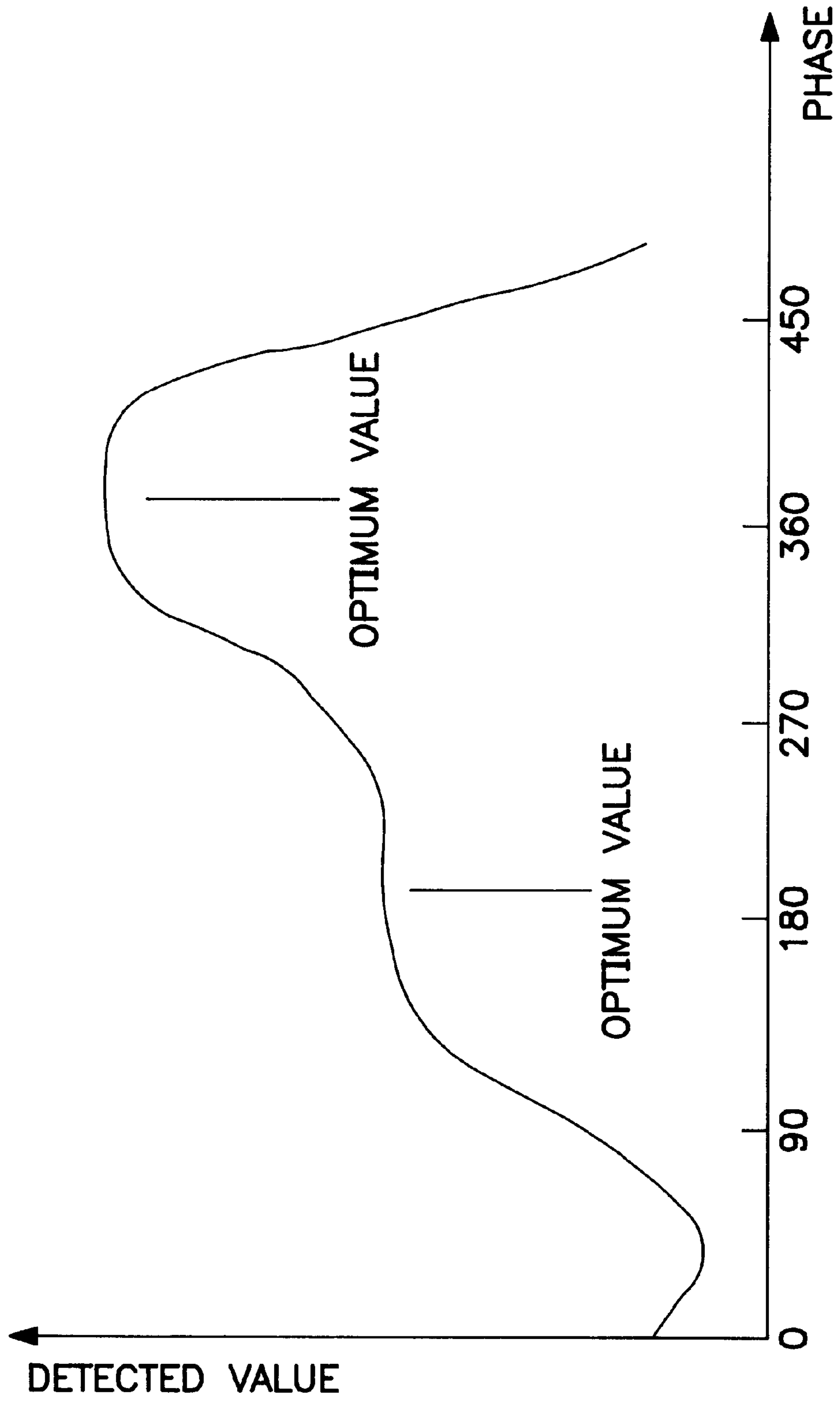
FIG. 11 is a histogram of clock phase and detected value in embodiment 3 of the invention.

Reference numeral 9 is a microcomputer for processing the output of the signal level detecting means 5, and controlling the phase adjusting means 7. The microcomputer 9 first controls the phase adjusting means 7, and delivers a clock of phase of 0 degree. At this time, the output of the signal level detecting circuit 5 is detected. Then, delivering a clock of phase of m degrees, the output of the signal level detecting circuit 5 is detected. Increase the phase by m degrees each successively, the output of each signal level detecting circuit 5 is detected, and a histogram is obtained as shown in FIG. 11.

The region in which the output of the signal level detecting circuit 5 is not changed so much in spite of certain changes of phase is the phase free from effect of jitter of the clock, that is, the optimum point to be determined by phase adjustment.

Since the frequency of the dot clock is always constant unless there is no change in the setting or kind of the device to be connected such as the computer, once adjusted, it is not adjust again so far as no change is made in the setting or the kind of the device connected, but the clock phase changes moment by moment depending on the device connected or temperature characteristic of the dot clock reproducing circuit, or more strictly, depending on the state of the connected stable, and hence ease of adjustment is demanded.

In this embodiment, thus, instead of using the video signal source for delivering adjusting signal, the phase of the dot clock is changed, and the optimum clock phase is determined on the basis of the phase difference and the differentiated result, so that the phase of the sampling clock can be corrected without input of specific signal.

(Embodiment 4)

Figure 12:
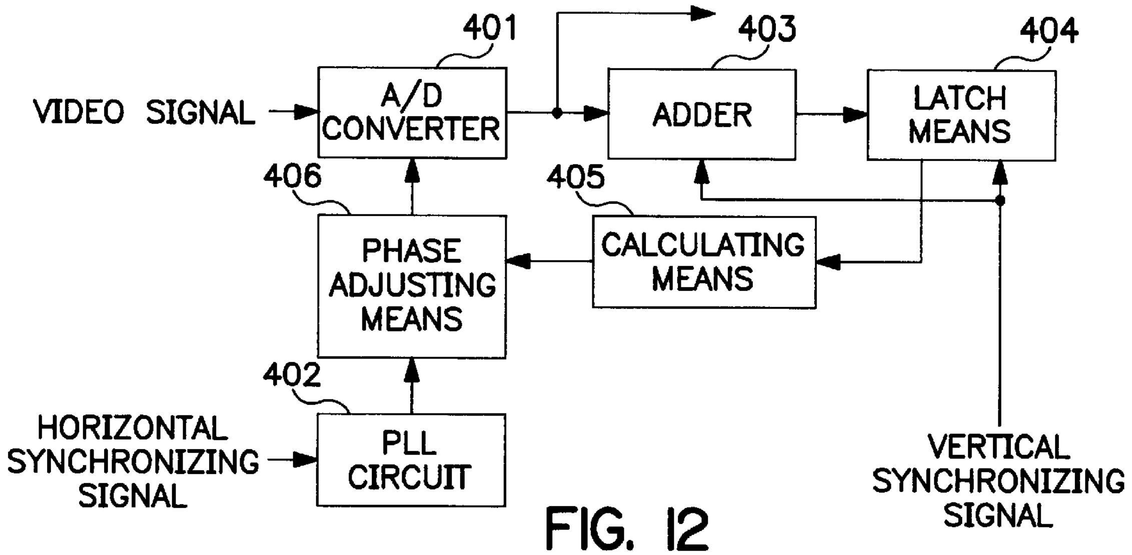
FIG. 12 is a block diagram of a dot clock reproducing apparatus according to embodiment 4 of the invention.

FIG. 12 is a block diagram of a dot clock reproducing apparatus in a fourth embodiment of the invention.

In FIG. 12, reference numeral 401 is an A/D converter for converting an input video signal of a computer or the like into a digital signal. Reference numeral 402 is a PLL circuit for generating a sampling clock synchronized with the input video signal, 403 is an adder for accumulating and adding the sampling outputs of the A/D converter 401, 404 is latch means for taking out the output of the adder 403 at the timing synchronized with the vertical synchronizing signal, 405 is calculating means for calculating the standard deviation of cumulative sum of the sampling values in the frame unit on the basis of the output of the latch means 404 by receiving the output of the latch means 404, and 406 is phase adjusting means for adjusting the phase of the dot clock delivered from the PLL circuit 402 depending on the value of the calculating means 405.

In thus constitution embodiment, the automatic phase adjusting operation of dot clock is described below. The input video signal necessary for the invention must be a still picture, being a signal constant in the frame direction. On the basis of the horizontal synchronizing signal of the input video signal, a dot clock synchronized with the input video signal is created by the PLL circuit 402. The input video signal is converted into a digital signal in the A/D converter 401 by the dot clock delivered from the PLL circuit 402.

At this time, the dot clock is supposed to be a clock at a frequency coinciding with the number of samples in the video signal. The output of the A/D converter 401 is put into the adder 403, and the adder 403 cumulatively adds the entered sampling values, and is reset by a vertical synchronizing signal. The output of the adder 403 is latched by the vertical synchronizing signal by the latch means 404, and the sum of the sampling values of one frame period is delivered. If the input video signal and dot clock are deviated in phase, in particular, when the transient portion of the video signal is the phase of the dot clock to be sampled by the A/D converter 401, the sample value changes due to a slight difference in the phase of the dot clock, and hence the sum of the sample values may vary depending on the frame.

Figure 13:
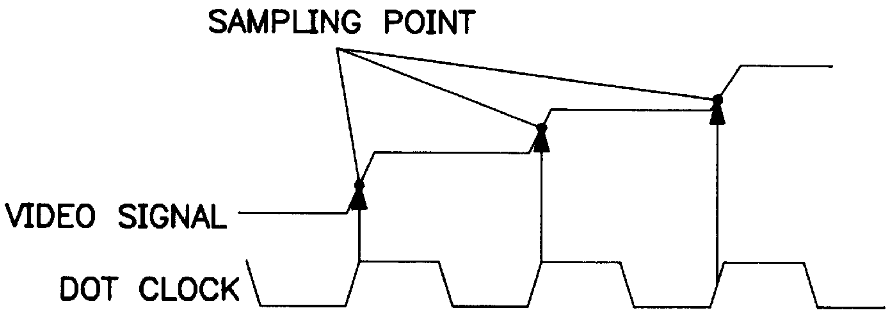
FIG. 13 is a diagram showing a state in which the video signal and dot clock are wrong is phase.
Figure 14:
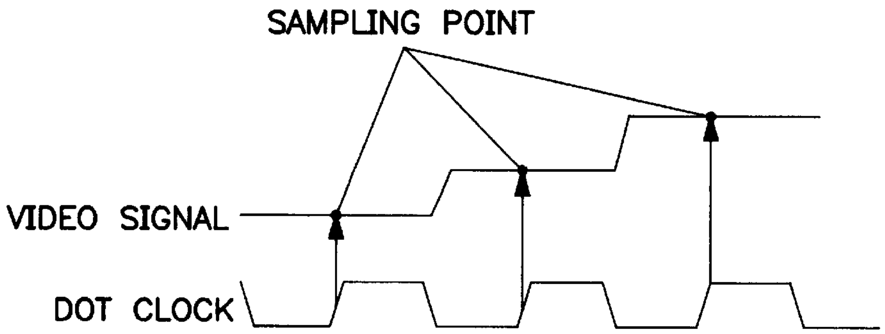
FIG. 14 is a diagram showing a state in which the video signal and dot clock are correct in phase.

In FIG. 13 and FIG. 14, the phase relation of the video signal and phase clock is shown. Of attempted to sample at the leading edge of the dot clock, the value of the leading edge in the phase relation as shown in FIG. 13 varies in the sampling value due to slight disturbance due to noise, and hence the sum of the sample values in the frame is changed.

In the case of the phase relation as shown in FIG. 14, the result of sampling at the leading edge is stable. The calculating means 405 determines the standard deviation from several output values of the latch means 404, and delivers the value to the phase adjusting means 406. The phase adjusting means 406 changes the phase of the dot clock delivered from the PLL circuit 402 depending on the output value of the calculating means 405. By the phase of the dot clock, the value sampled in the A/D converter 401 is put again into the adder 403.

Thus, by repeating the above operation, the output of the calculating means 405 becomes minimum, that is, the sum of the sampling values of every frame is constant, so that the video signal and the dot clock are matched in phase (FIG. 14).

The phase adjusting phase of the dot clock can be easily raised by increasing the number of values calculated by the calculating means 405, that is, the number of frames used in calculation.

In this embodiment, the phase adjusting means is provided between the PLL circuit 402 and A/D converter 401, but it is also possible to realize the same operation as in the embodiment by incorporating the function of phase adjustment in the PLL circuit 402.

In the embodiment, the A/D converter 401, adder 403, and latch means 404 are explained as one of three colors, red, green and blue, but the same operation as in the embodiment can be realized by feeding the output of latch means 404 of each color into the calculating means 405, and controlling the phase adjusting means 406 by the standard deviation of three colors.

Thus, by monitoring the changes of sampling value occurring when the phases of the input video signal and reproduced dot clock are deviated for several frames, it is effective to adjust automatically the phase of the dot clock so as to minimize the standard deviation of the cumulative sum of the sampling values in several frames.

(Embodiment 5)

Figure 15:
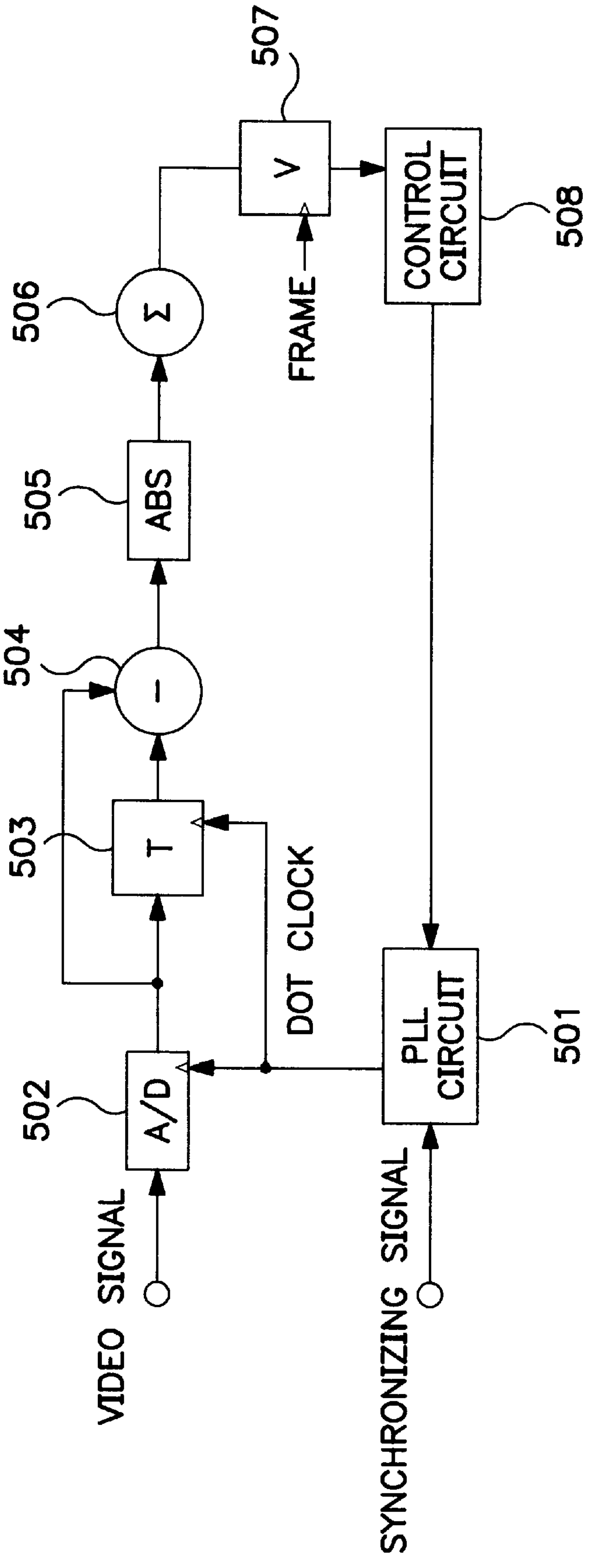
FIG. 15 is a block diagram of embodiment 5 of the invention.
Figure 16:
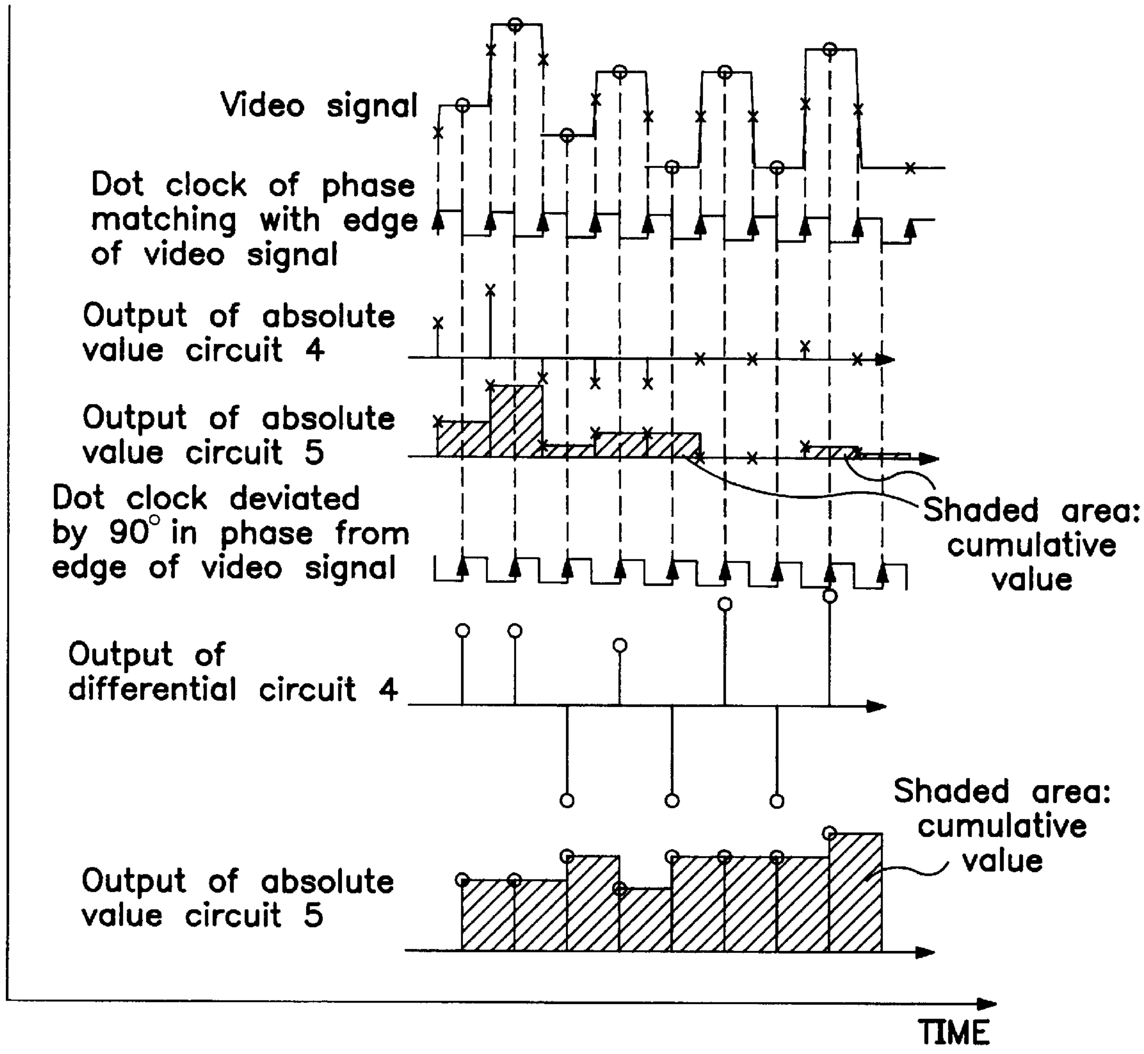
FIG. 16 is a diagram showing a sampling example.

A fifth embodiment of the invention is described by referring to FIG. 15 and FIG. 16.

In FIG. 15, reference numeral 501 is a PLL circuit for reproducing a dot clock synchronized with the synchronizing signal when a video signal produced by a computer, for example, is received as input signal, and controlling the phase of the dot clock. Reference numeral 502 is an A/D converter for sampling the video signal, using the dot clock as the sampling clock, and converting into a digital signal. Reference numeral 503 is a latch circuit for delaying the digital signal produced by the A/D converter 501 by one period of the sampling clock, 504 is a differential circuit for delivering the difference by receiving the input and output signals of the latch circuit for determining the difference of sample values between adjacent samples, 505 is an absolute value circuit for producing the absolute value delivered from the differential circuit 504, and 506 is a cumulative circuit for sequentially accumulating the outputs of the absolute value circuit 505.

Reference numeral 507 is a latch circuit for latching the output of the absolute value circuit 505 by one vertical period. The cumulative circuit 506 receives a clear pulse so as to be cleared after latch of the latch circuit 507, and thereby the cumulative result of each vertical period is entered in a control circuit 508 mentioned below. Reference numeral 508 is a control circuit for generating a phase control signal for controlling the phase of the dot clock by receiving the output of the latch circuit 507.

FIG. 16 shows the sampling mode of the A/D converter by the dot clock, together with an example of the video signal.

As shown in FIG. 16, it is known that the video signal cannot be sampled correctly by the phase of the dot clock although the wave height is changed in the dot clock period.

If there is any slight change point in one vertical period of video signal, the change amount is added cumulatively by the cumulative circuit 506 through the absolute value circuit 505 by the differential circuit 504, so that the phase status of the dot clock can be judged.

The control circuit 508 can automatically adjust the phase of the control content of the phase control signal and the result from the cumulative circuit 506 by using a proper algorithm. As the algorithm, for example, a phase to minimize the value of the cumulative circuit 506 is investigated and used as reference phase.

At the reference phase, the leading edge of the dot clock and the edge of the video signal are matched perfectly, and the video signal sample in this phase status is a most flat and dull image when displayed on the screen. Therefore, by shifting the phase so as to have a specified phase difference from the reference phase, for example, 30 degrees, 45 degrees or 60 degrees, the video signal can be sampled correctly.

In this way, by adjusting the phase of the dot clock and changing the sample point, the difference in sample value increases or decreases between the adjacent samples, thereby adjusting automatically so that the relation between the phase and the difference may satisfy the specified condition.

(Embodiment 6)

Figure 17:
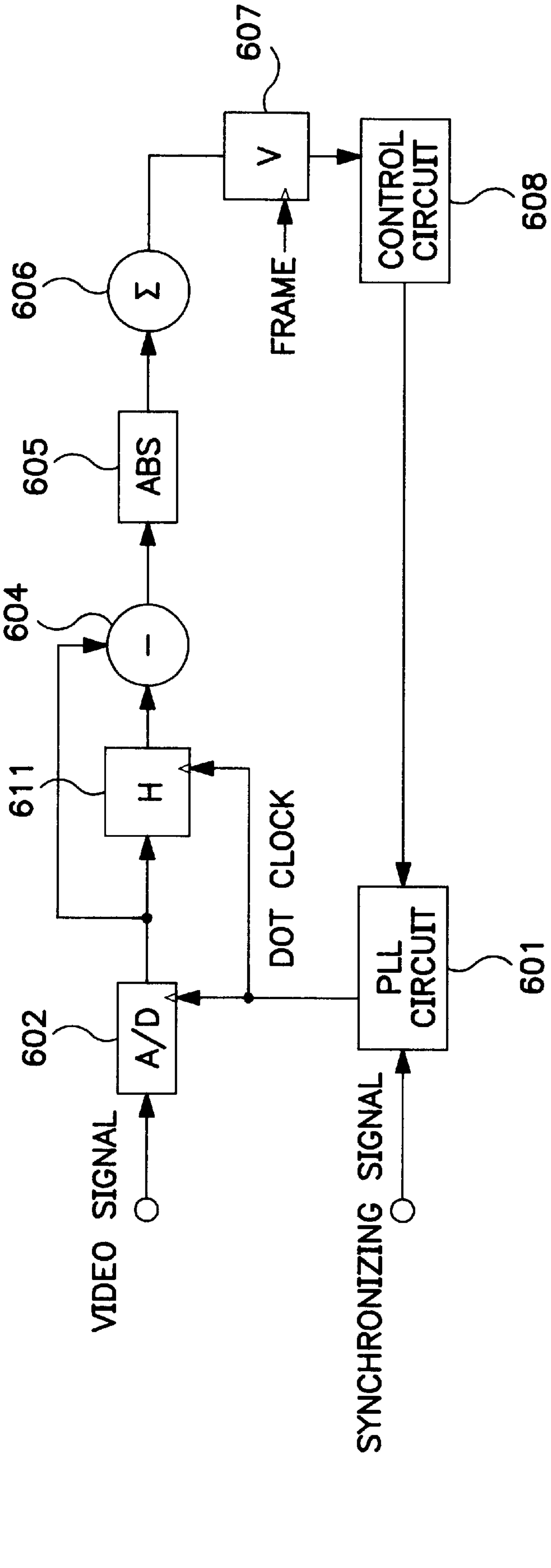
FIG. 17 is a block diagram of embodiment 6 of the invention.
Figure 18A:
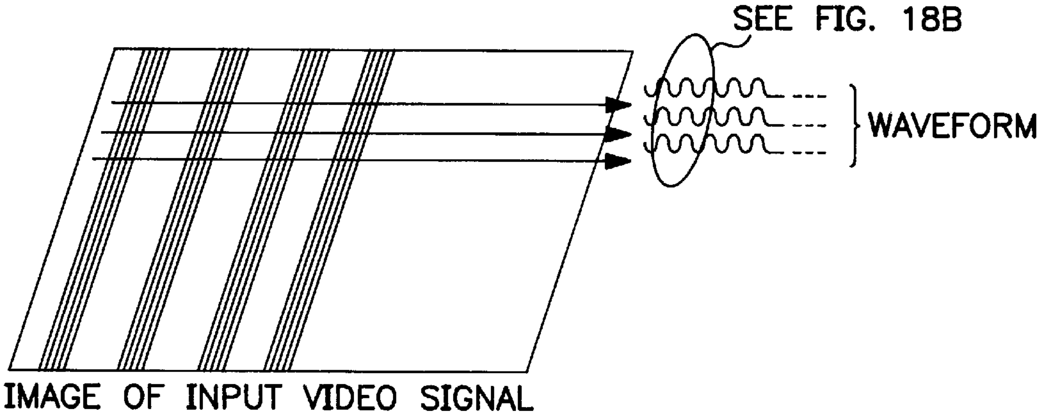
FIG. 18(*a*) is a diagram of an image of an input video signal.
Figure 18B:
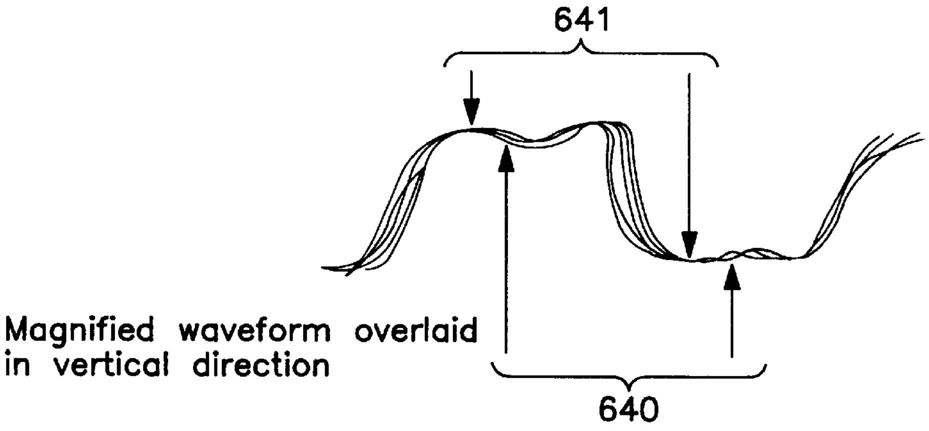

A sixth embodiment of the invention is described while referring to FIG. 17 and FIG. 18.

In FIG. 17, reference numeral 601 is a PLL circuit capable of reproducing a dot clock synchronized with a synchronizing signal, and controlling the phase of the dot clock, when receiving the video signal produced by a computer, for example, as an input signal.

Reference numeral 602 is an A/D converter for sampling the video signal, using the dot clock as sampling clock, and converting into a digital signal.

Reference numeral 611 is a line memory for delaying the digital signal delivered by the A/D converter 601 by the period of one line, 604 is a differential circuit for receiving the line memory input and output signals, and delivering the difference, 605 is an absolute value circuit for delivering the absolute value produced from the differential circuit 604, and 606 is a cumulative circuit for sequentially accumulating the outputs of the absolute value circuit 605.

Reference numeral 607 is a latch circuit for latching the output of the absolute value circuit 605 by the period of one frame. The cumulative circuit 606 receives a clear pulse so as to be cleared after latching of the latch circuit 607, and consequently the cumulative result per frame is entered in a control circuit 608 mentioned below.

Reference numeral 608 is a control circuit for generating a phase control signal for controlling the phase of the dot clock by receiving the output of the latch circuit 607.

The operation of thus constituted embodiment 6 is described below.

FIG. 18(*a*) is a view of an input video signal and FIG. 18(*b*) is a magnified view when the video signal having a vertical correlation is overlaid in the line period.

The video signal is an analog signal, and a plurality are displayed as shown in the diagram, and it means the waveform corresponding to the pixel on a same vertical line is always fluctuating finely due to jitter of the dot clock or noise or the like from the transmission route.

When the sampling point is on arrow 640 in the diagram, if the image has a vertical correlation, the sampling value of the pixel on the pixel on the same adjacent vertical line is changed.

The change of sampling value is detected by the differential circuit 604 in every pixel, and passes through the absolute value circuit 605, and is detected as the sum of change amounts of all frames in the cumulative circuit 606.

On the other hand, by changing the phase of the dot clock, when the sampling point is brought onto the arrow 641 in FIG. 18, the sampling value is constant, and the output of the differential circuit 604 is close to 0. Accordingly, the value obtained in the cumulative circuit 606 is smaller than in other phase.

The latch circuit 607 disposed between the cumulative 606 and the control circuit 608 is provided for the ease of receiving the output value of the cumulative circuit 606 by the control circuit 608, and it is not absolutely necessary structurally.

The control circuit 608 can adjust the phase automatically if the phase is controlled so that the output value of the cumulative circuit 606 may be small. Hence, the algorithm is not particularly defined.

Of course, the control circuit 608 can adjust automatically at higher precision by controlling so that the output value of the cumulative circuit 606 may satisfy arbitrary conditions.

Thus, by adjusting the phase of the dot clock and changing the sample point by the A/D converter, the output of the cumulative circuit varies, and hence the phase status of the dot clock and video signal can be detected, and therefore the phase of the dot clock can be adjusted automatically by the control circuit so that the output of the cumulative circuit may satisfy the specified conditions. In the embodiment, especially in the case of the image having a vertical correlation, automatic adjustment of phase is discussed.

(Embodiment 7)

A seventh embodiment of the invention is described below while referring to FIG. 19 and FIG. 20.

Figure 19:
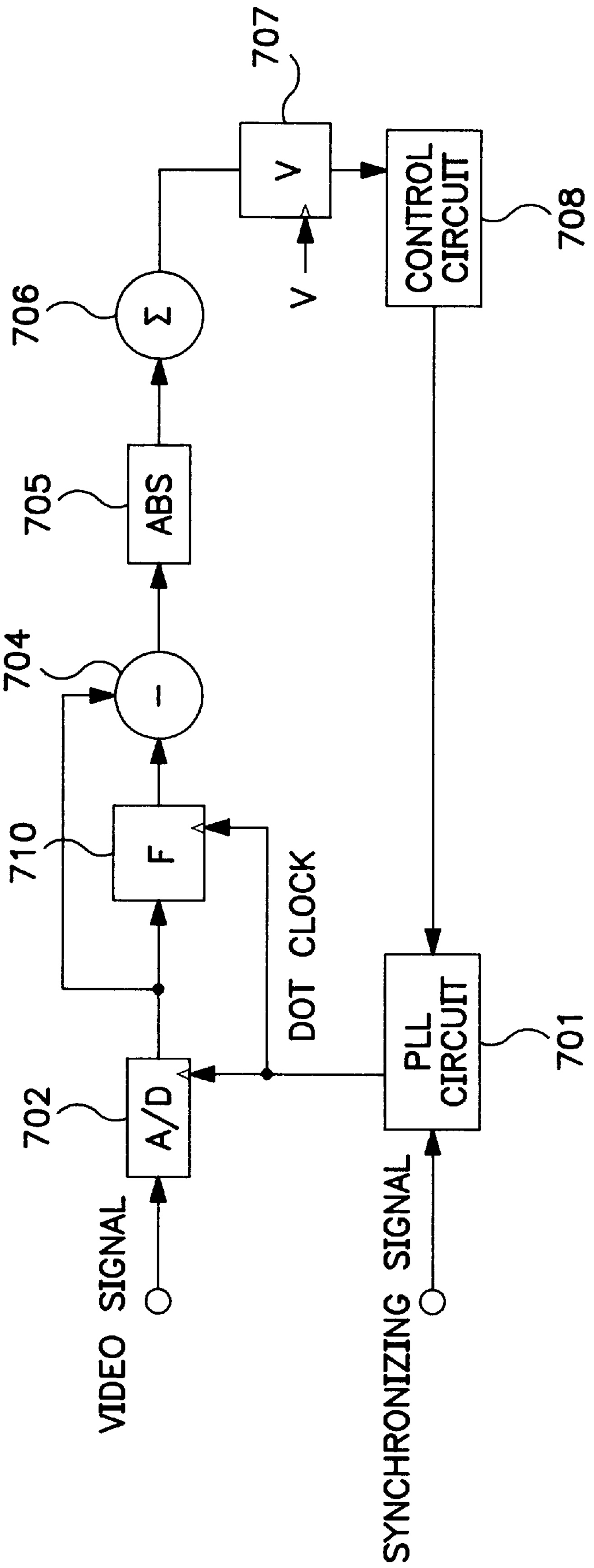
FIG. 19 is a block diagram of embodiment 7 of the invention.

In FIG. 19, reference numeral 701 is a PLL circuit capable of reproducing a dot clock synchronized with the synchronizing signal, and controlling the phase of the dot clock, when receiving, for example, an output video signal of computer as input signal. Reference numeral 702 is an A/D converter for sampling the video signal, using the dot clock as the sampling clock, and converting into a digital signal. Reference numeral 710 is a frame memory for delaying the digital signal delivered from the A/D converter 702 by the period of one frame, 704 is a differential circuit for receiving the input and output signals of the frame memory 710, and delivering the difference, 705 is an absolute value circuit for delivering the absolute value of the output from the differential circuit 704, and 706 is a latch circuit for latching the output of the absolute value circuit 705 by the period of one frame. Reference numeral 707 is a latch circuit for latching the output of the absolute value circuit 705 for the period of one frame.

The cumulative circuit 706 receives a clear pulse so as to be cleared after latching of the latch circuit 707, and consequently the cumulative result per frame is entered in a control circuit 708 mentioned below.

Reference numeral 708 is a control circuit for generating a phase control signal for controlling the phase of the dot clock by receiving the output of the latch circuit 707.

Figure 20A:
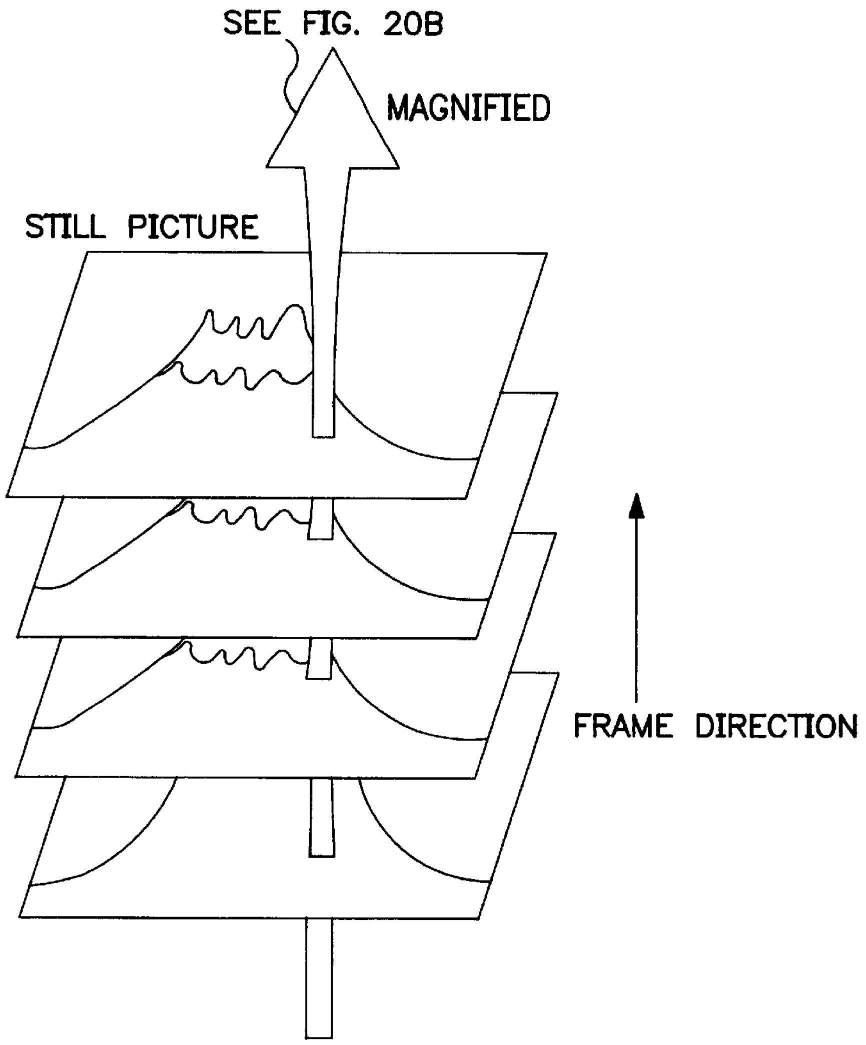
FIG. 20(*a*) is a diagram of multiple video signals.

The operation of thus constituted embodiment 7 is described below by referring to FIGS. 20*a* and 20*b*.

FIG. 20(*a*) is a diagram of multiple video signals and FIG. 20(*b*) is a magnified view when a video signal of a still picture is overlaid in the frame period.

The video signal is an analog signal, and plural lines are shown as in the diagram meaning that the waveform corresponding to the same pixel on a still picture is always fluctuating finely due to jitter of the dot clock or noise or the like from the transmission route.

Figure 20B:
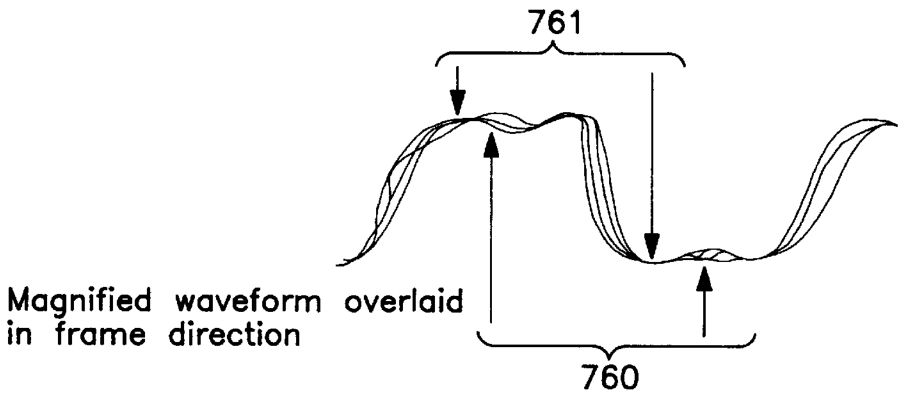

When the sampling point is on arrow 760 in FIG. 20*b*, if it is a still picture, the frame is different, and the sampling value of the same pixel is changed.

The change of sampling value is detected by the differential circuit 704 in every pixel, and passes through the absolute value circuit 705, and the sum of change amounts of all frames is detected in the cumulative circuit 706.

On the other hand, by varying the phase of the dot clock, when the sampling point is brought onto arrow 761 in FIG. 20*b*, the sampling value is constant, and the output of the differential circuit 704 is a value close to 0. Hence, the value obtained by the cumulative circuit 706 is smaller than in other phase.

The latch circuit 707 disposed between the cumulative circuit 706 and the control circuit 708 is provided for the ease of receiving the output value of the cumulative circuit 706 by the control circuit 708, and it is not absolutely necessary structurally.

The control circuit 708 can adjust the phase automatically if the phase is controlled so that the output value of the cumulative circuit 706 may be small. Hence, the algorithm is not particularly defined.

Of course, the control circuit 708 can adjust automatically at higher precision by controlling so that the output value of the cumulative circuit 706 may satisfy arbitrary conditions.

(Embodiment 8)

An eighth embodiment of the invention is described below while referring to FIG. 21.

Figure 21:
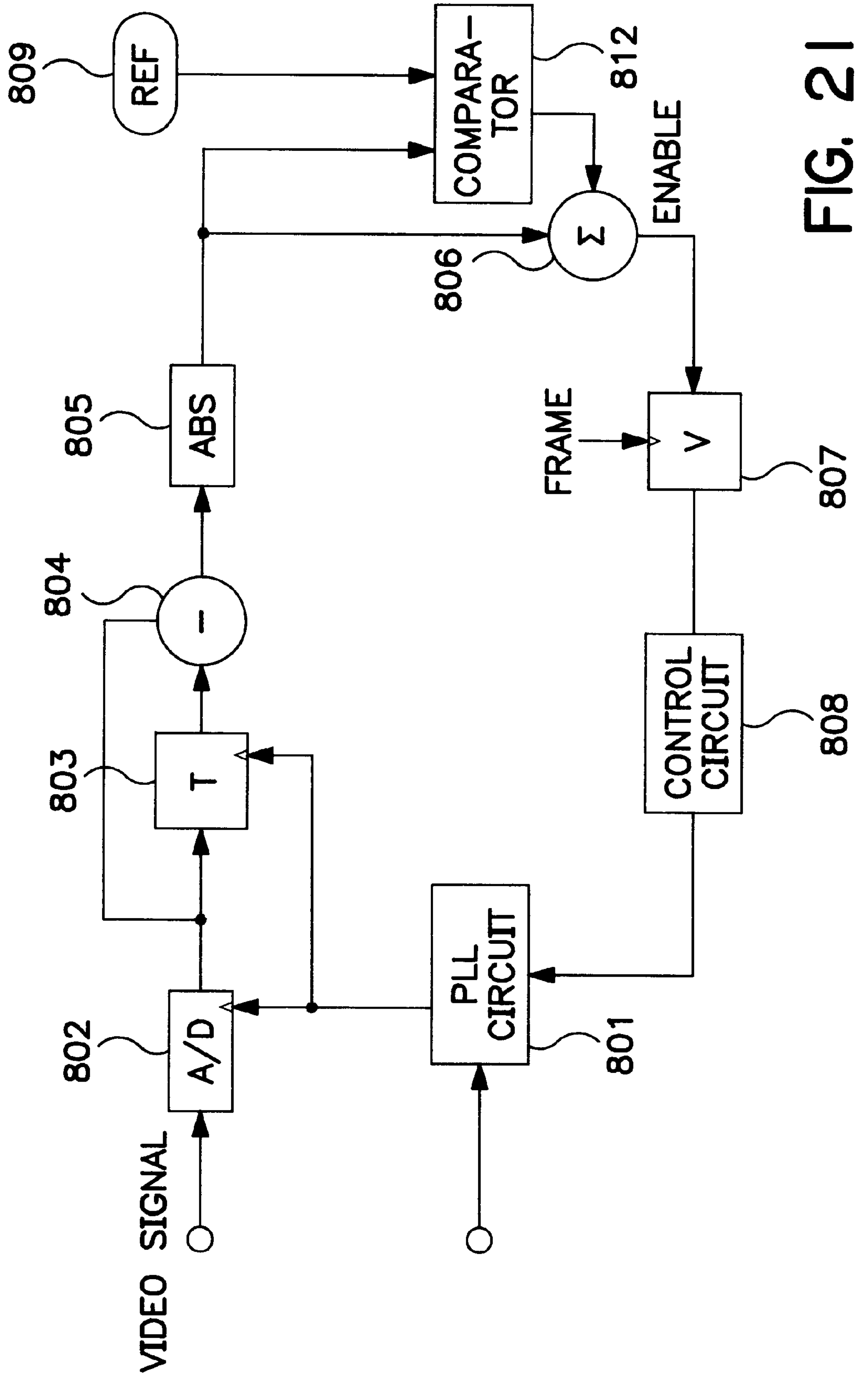
FIG. 21 is a block diagram of embodiment 8 of the invention.

In FIG. 21, reference numeral 801 is a PLL circuit capable of reproducing a dot clock synchronized with the synchronizing signal, and controlling the phase of the dot clock, when receiving, for example, an output video signal of computer as input signal.

Reference numeral 802 is an A/D converter for sampling the video signal, using the dot clock as the sampling clock, and converting into a digital signal. Reference numeral 803 is a latch circuit for delaying the digital signal delivered by the A/D converter by one period of sampling clock, 804 is a differential circuit for receiving the input and output signals of the latch circuit, and delivering the difference in order to find the difference of sample values between adjacent samples, 805 is an absolute value circuit for delivering the absolute value of the output from the differential circuit is a memory circuit for storing a preset value. 812 is a comparator for comparing the output of the absolute value circuit 805 and the output of the memory circuit, and delivering an enable signal so as to perform cumulative action of a cumulative circuit 806 when the output of the absolute value circuit 805 is greater, and 806 is a cumulative circuit for sequentially accumulating the outputs of the absolute value circuit 805 according to the enable signal.

Reference numeral 807 is a latch circuit for latching the output of the absolute value circuit 805 by the period of one frame. The cumulative circuit 806 receives a clear pulse so as to be cleared after latching of the latch circuit 807, and consequently the cumulative result per frame is entered in a control circuit 808 mentioned below.

Reference numeral 808 is a control circuit for generating a phase control signal for controlling the phase of the dot clock by receiving the output of the latch circuit 807.

The operation of thus constituted embodiment 8 is described below. In this embodiment, to the foregoing embodiment 5, the comparator are added, and on/off switching of the cumulative action of the cumulative circuit 806 is realized.

Therefore, detailed description is omitted for the blocks operating same as in FIG. 15.

When the absolute value of the output of the absolute value circuit 805 is larger than the set value set in the memory circuit 809, it is regarded as an edge portion of the image, and only the edge portion is accumulated, so that the precision of automatic adjustment can be enhanced.

In this way, by adjusting the phase of the dot clock, when the sample point changes, the sample value difference between adjacent samples increases or decreases, and by making use of this phenomenon, the automatic adjustment is effected so that the relation of the phase and difference may satisfy a specific condition. In this embodiment, in particular, when the absolute value is larger than the set value, it is regarded is the edge portion of an image, and only the edge portion is accumulated adaptively, so that the precision of automatic adjustment may be enhanced.

(Embodiment 9)

A ninth embodiment of the invention is described below while referring to FIG. 22.

Figure 22:
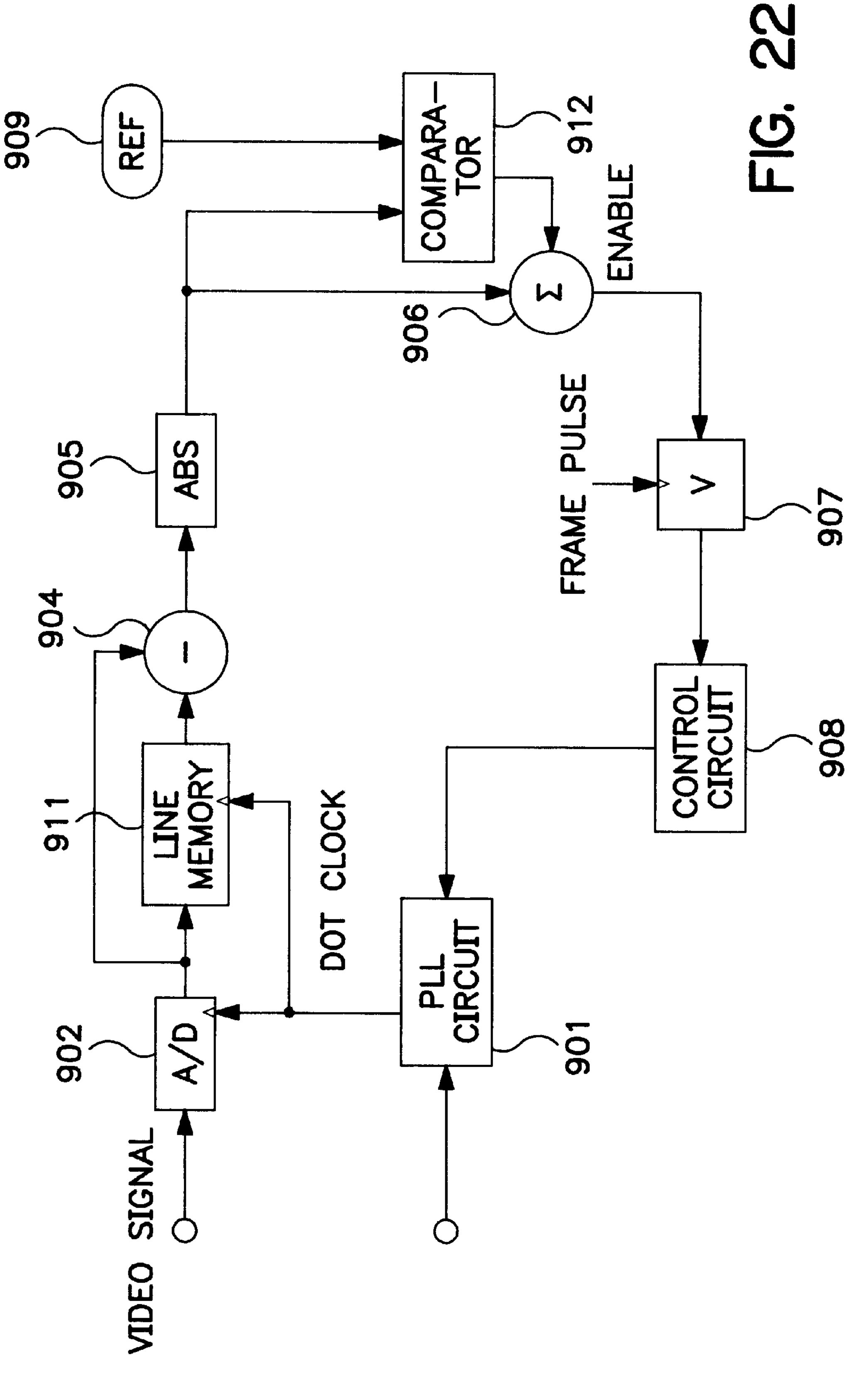
FIG. 22 is a block diagram of embodiment 9 of the invention.

In FIG. 22, reference numeral 901 is a PLL circuit capable of reproducing a dot clock synchronized with the synchronizing signal, and controlling the phase of the dot clock, when receiving, for example, an output video signal of computer as input signal.

Reference numeral 902 is an A/D converter for sampling the video signal, using the dot clock as the sampling clock, and converting into a digital signal.

Reference numeral 911 is a line memory for delaying the digital signal delivered by the A/D converter 902 by the period of one line, 904 is a differential circuit for receiving the input and output signals of the line memory, and delivering the difference, 905 is an absolute value circuit for delivering the absolute value of the output from the differential circuit 904, 909 is a memory circuit for storing a preset value, 912 is a comparator for comparing the output of the absolute value circuit 905 and the output of the memory circuit 909, and delivering an enable signal so as to perform cumulative action of a cumulative circuit 906 when the output of the absolute value circuit 905 is smaller, and 906 is a cumulative circuit for sequentially accumulating the outputs of the absolute value circuit 905 according to the enable signal.

Reference numeral 907 is a latch circuit for latching the output of the absolute value circuit 905 by the period of one frame.

The cumulative circuit 906 receives a clear pulse so as to be cleared after latching of the latch circuit 907, and consequently the cumulative result per frame is entered in a control circuit 908 mentioned below.

Reference numeral 908 is a control circuit for generating a phase control signal for controlling the phase of the dot clock by receiving the output of the latch circuit 907.

The operation of thus constituted embodiment 9 is described below. In this embodiment, to the foregoing embodiment 6, the comparator 912 and memory circuit 909 are added, and start/stop switching of the cumulative action of the cumulative circuit 906 is realized.

Therefore, detailed description is omitted for the blocks operating same as in FIG. 17.

When the absolute value of the output of the absolute value circuit 905 is smaller than the set value set in the memory circuit 909, it is accumulated as the pixel having a vertical correlation, so that automatic adjustment is possible when there is a pixel having a vertical correlation in the image, which solves the problem of extreme limiting of the image in the input signal as noted in embodiment 6.

Thus, when the absolute value is smaller than the set value, it is judged not having vertical correlation to the image and is not accumulated, so that only the portion having vertical correlation to the image can be accumulated. Therefore, if there is a portion having a very slight vertical correlation in the input image, automatic adjustment is possible.

(Embodiment 10)

A tenth embodiment of the invention is described below while referring to FIG. 23.

Figure 23:
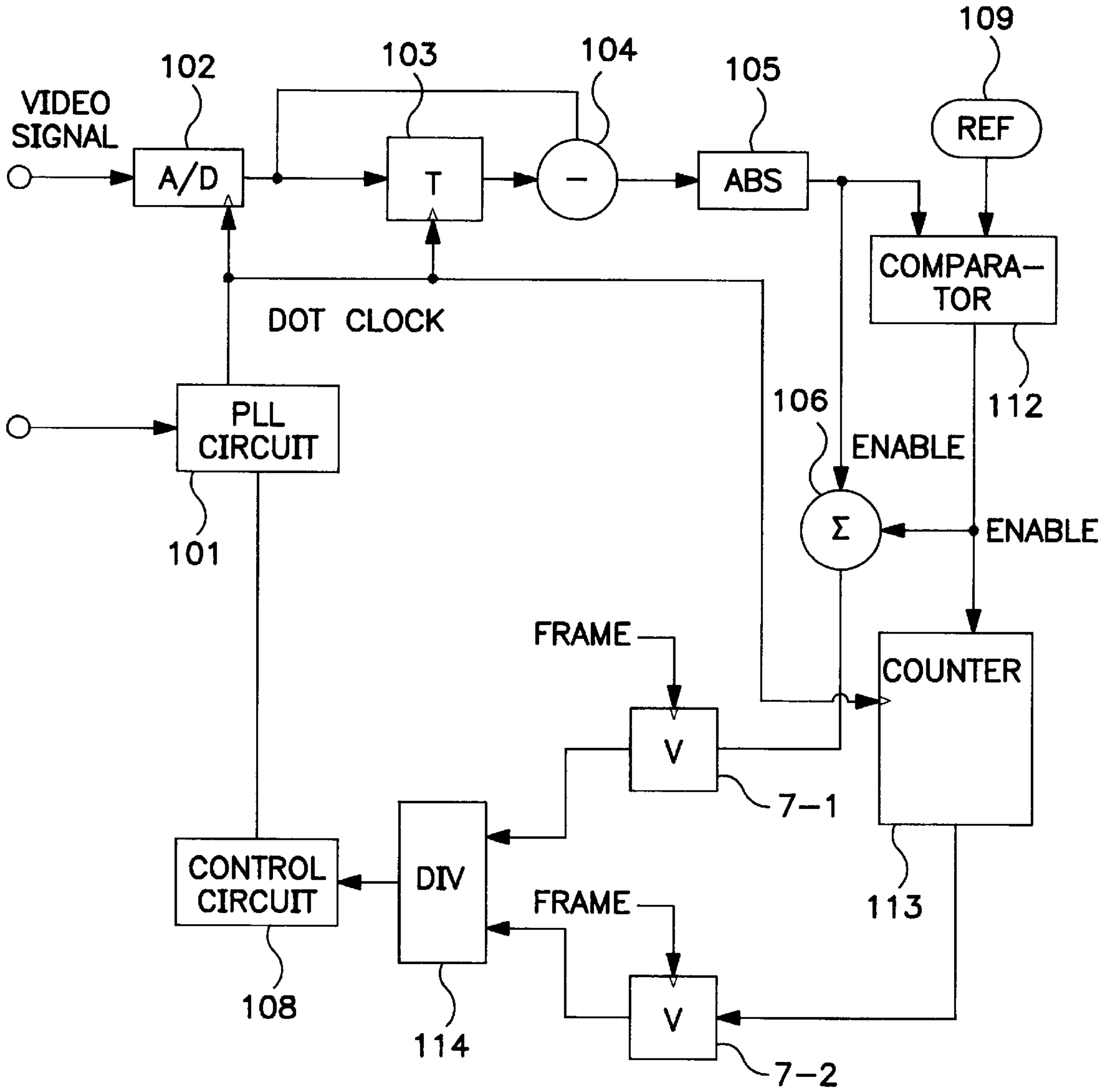
FIG. 23 is a block diagram of embodiment 10 of the invention.

In FIG. 23, reference numeral 101 is a PLL circuit capable of reproducing a dot clock synchronized with the synchronizing signal, and controlling the phase of the dot clock, when receiving, for example, an output video signal of computer as input signal.

Reference numeral 102 is an A/D converter for sampling the video signal, using the dot clock as the sampling clock, and converting into a digital signal.

Reference numeral 103 is a latch circuit for delaying the digital signal delivered by the A/D converter 102 by one period of sampling clock, 104 is a differential circuit for receiving the input and output signals of the latch circuit, and delivering the difference in order to find the difference of sample values between adjacent samples, 105 is an absolute value circuit for delivering the absolute value of the output from the differential circuit 104, 109 is a memory circuit for storing a preset value, 112 is a comparator for comparing the output of the absolute value circuit 105 and the output of the memory circuit 109, and delivering an enable signal so as to perform cumulative action of a cumulative circuit 106 when the output of the absolute value circuit 105 is greater, and 106 is a cumulative circuit for sequentially accumulating the outputs of the absolute value circuit 105 according to the enable signal. Reference numeral 7-2 is a latch circuit for latching the output of the absolute value circuit 105 and the output of a counter 113 by the period of one frame.

Reference numeral 114 is a divider for dividing the output value of the cumulative circuit 106 by the output of the counter 113, and delivering the quotient to a control circuit 108.

The operation of thus constituted embodiment 10 is described below.

In this embodiment, to the foregoing embodiment 9, the counter 113 and the latch circuit 7-2 for latching the output of the counter 113 by the period of one frame are added, and therefore the output of the cumulative circuit 106 passes through the latch circuit 7-1, and is divided by the output value of the latch circuit 7-2 in the divider 114, and enters the control circuit. Hence, detailed description is omitted for the blocks operating same as in FIG. 21.

When the absolute value of the output of the absolute value circuit 105 is greater than the set value set in the memory circuit 109, it is regarded as the edge portion of the image, and only the edge portion is accumulated, and further the accumulated number of pixels counted by the counter 113, and the average per pixel is calculated in the divider 114. Hence, if the number of pixels judged to be edge portion due to noise or the like changes, the value of smaller effect is put into the control circuit 108, and the precision of automatic adjustment is enhanced.

(Embodiment 11)

An eleventh embodiment of the invention is described below while referring to FIG. 24 and FIG. 25.

Figure 24:
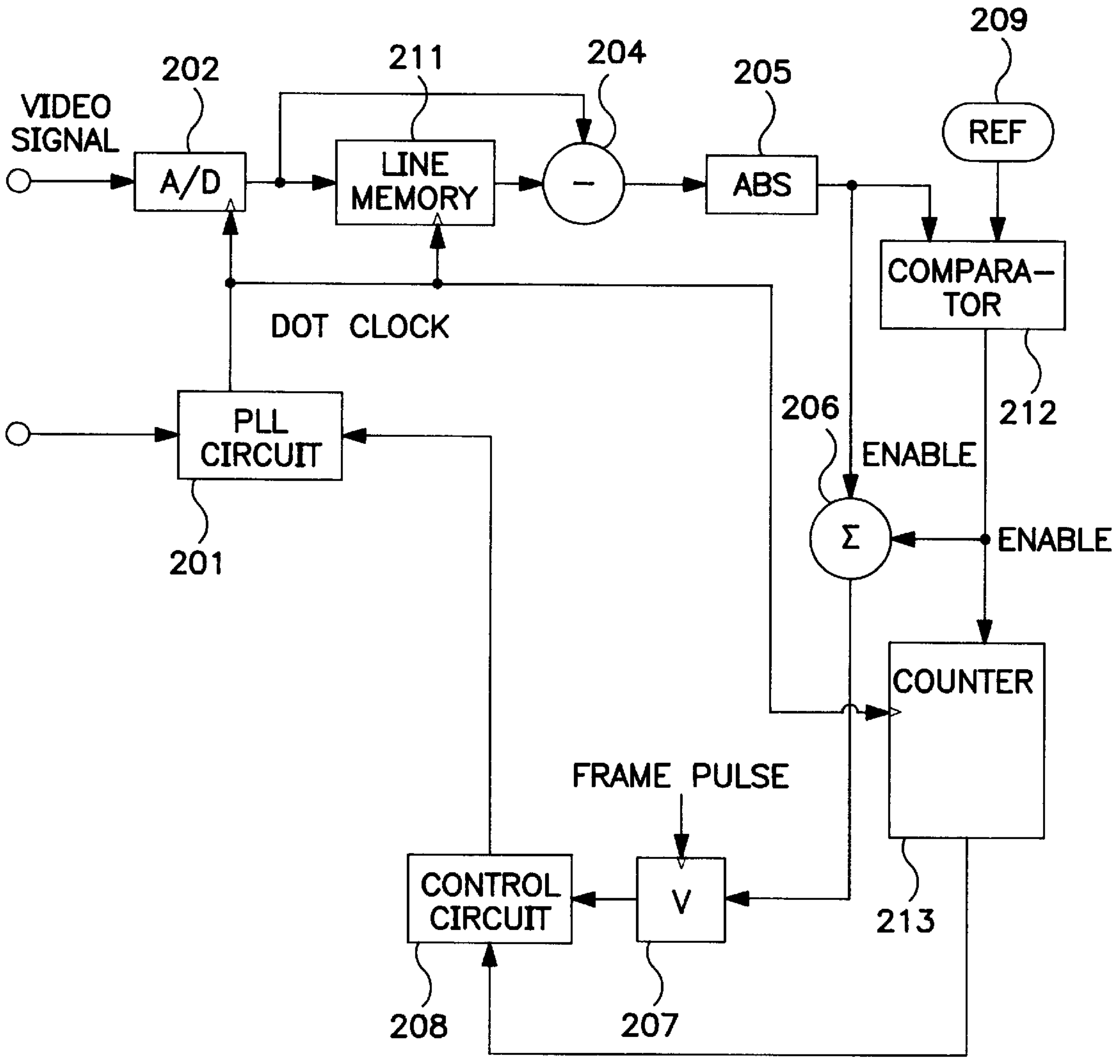
FIG. 24 is a block diagram of embodiment 11 of the invention.
Figure 25:
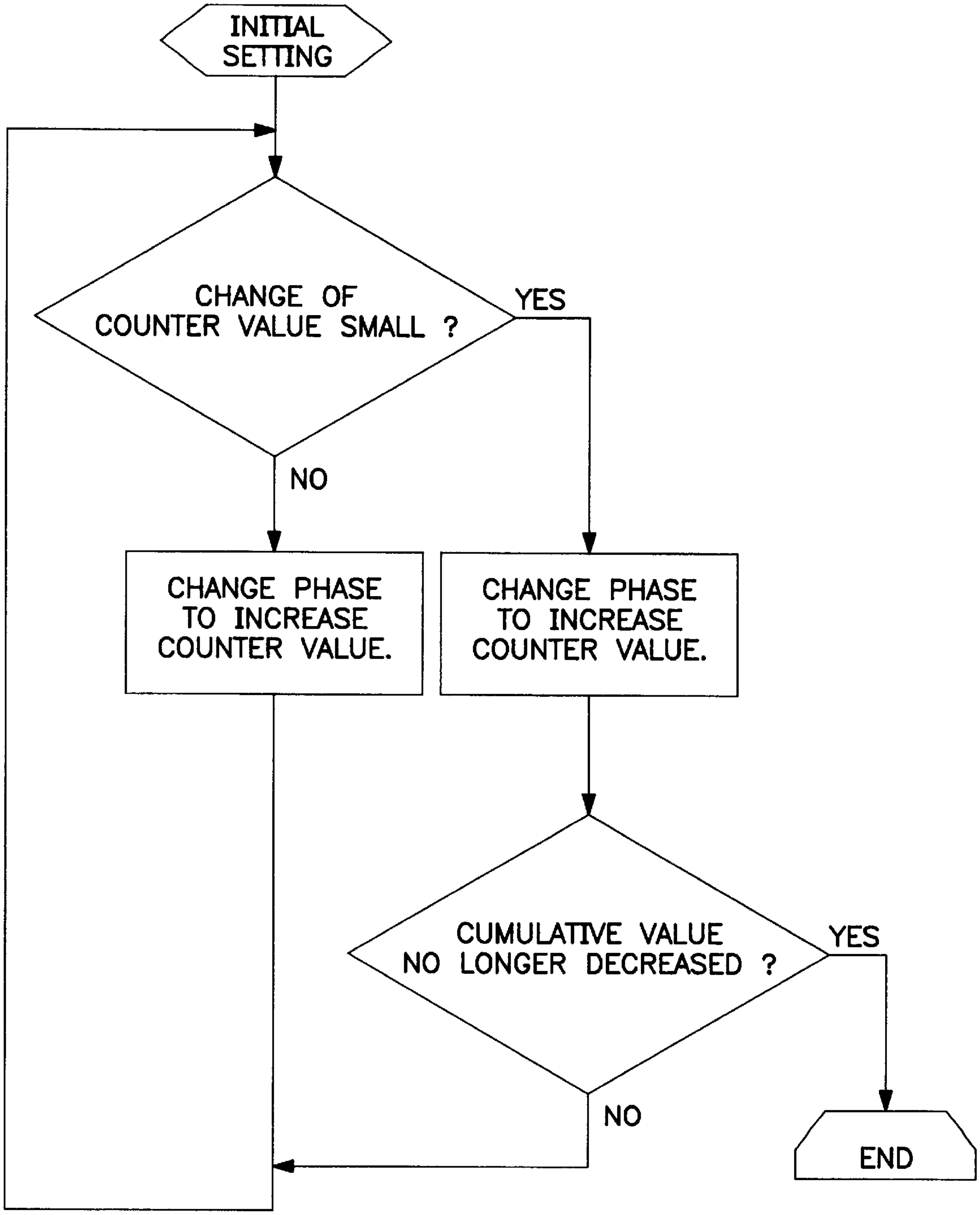
FIG. 25 is a flowchart in a control circuit 708 of embodiment 11 of the invention.
Figure 26:
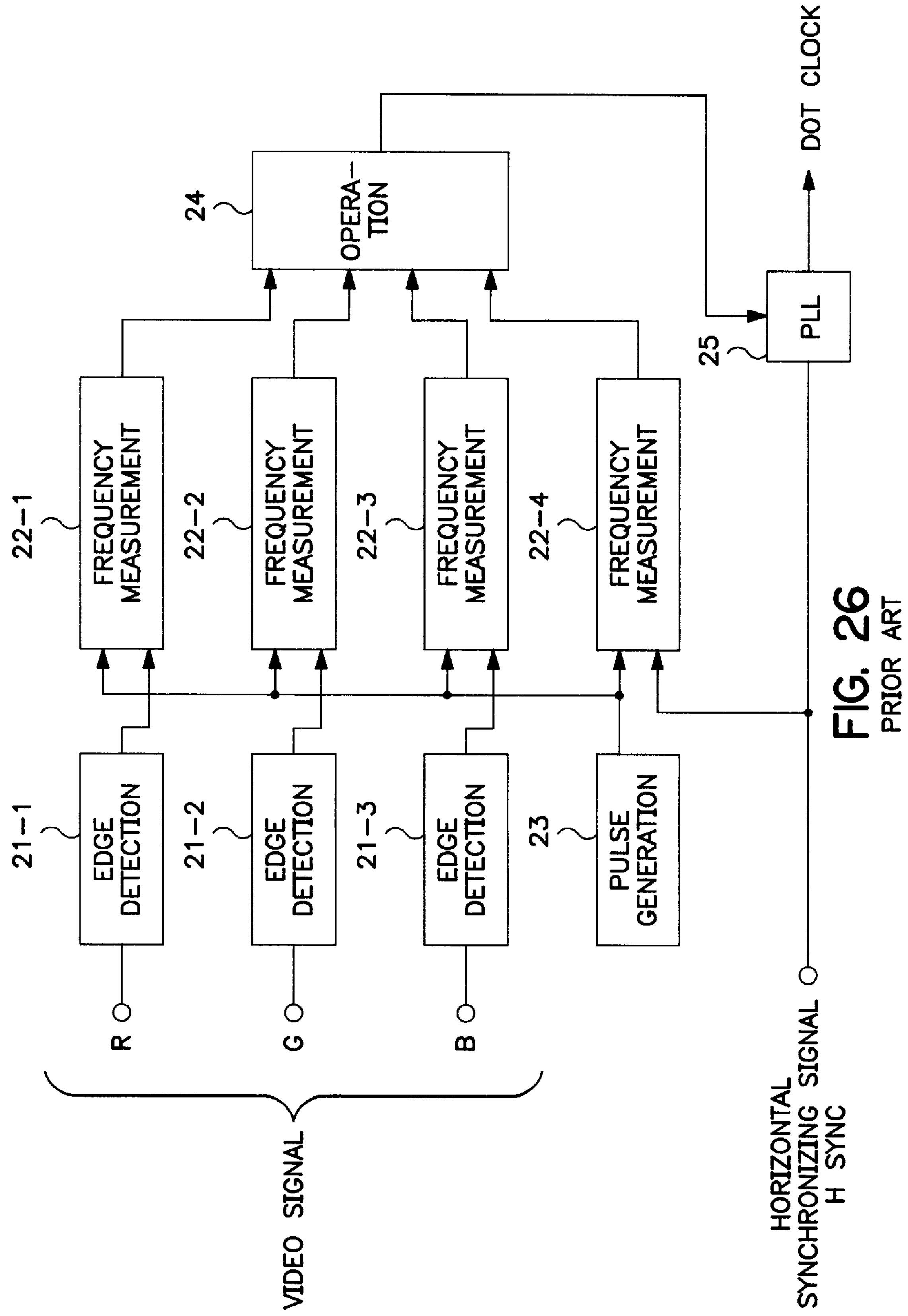
FIG. 26 PRIOR ART
FIG. 26 is a diagram showing a conventional dot clock reproducing apparatus.

In FIG. 24, reference numeral 201 is a PLL circuit capable of reproducing a dot clock synchronized with the synchronizing signal, and controlling the phase of the dot clock, when receiving, for example, an output video signal of computer as input signal.

Reference numeral 202 is an A/D converter for sampling the video signal, using the dot clock as the sampling clock, and converting into a digital signal. Reference numeral 211 is a line memory for delaying the digital signal delivered by the A/D converter 202 by the period of one line, 204 is a differential circuit for receiving the input and output signals of the line memory 211, and delivering the difference, 205 is an absolute value circuit for delivering the absolute value of the output from the differential circuit 204, 209 is a memory circuit for storing a preset value, 212 is a comparator for comparing the output of the absolute value circuit 205 and the output of the memory circuit 209, and delivering an enable signal so as to perform cumulative action of a cumulative circuit 206 when the output of the absolute value circuit 205 is smaller, and 206 is a cumulative circuit for sequentially accumulating the outputs of the absolute value circuit 205 according to the enable signal.

Reference numeral 213 is a counter for counting the dot clock according to the enable signal, and delivering the counting result to a control circuit 208, and 207 is a latch circuit for latching the output of the absolute value circuit 205 by the period of one frame.

The cumulative circuit 206 receives a clear pulse so as to be cleared after latching of the latch circuit 207, and consequently the cumulative result per frame is entered in a control circuit 208 mentioned below.

Reference numeral 208 is a control circuit for generating a phase control signal for controlling the phase of the dot clock by receiving the output of the latch circuit 207.

The operation of thus constituted embodiment 11 is described below. In this embodiment, to the foregoing embodiment 10, the counter 213 is added, and start/stop switching of the counting action of the dot clock by using the enable signal delivered by the comparator 212 is realized.

Therefore, detailed description is omitted for the blocks operating same as in FIG. 22.

The number of pixels accumulated by the cumulative circuit 206 is counted by the counter 213, so that the control circuit 208 can adjust automatically.

In the still picture, in essence, the number of pixels having vertical correlation is not changed. Therefore, by changing the phase of the dot clock, when the counting value of the counter 213 is changed, it may be considered that the phase is in appropriate. The flowchart in FIG. 25 shows an example of automatic adjustment by the changes of the counting value of the counter 213 owing to the above reason. Of course, it is enough as far as the same operation is made if the terminating condition of the flowchart or the algorithm for changing the phase is changed.

As described herein, this embodiment solves the problem of the effect of the precision of detection of vertical correlation on the phase state of the dot clock noted in embodiment 10.

Thus, according to the invention, by delivering an adjusting signal from a video signal source, comprising the means for detecting aliasing frequency component for this adjusting signal and means for detecting without specifying the signal in the means for detecting the phase difference, it is possible to present a dot clock reproducing apparatus capable of reproducing an optimum dot clock when connecting a video signal source such as computer and an image display device.

Therefore, correction of phase deviation due to dot clock frequency unknown to the user or factor in transmission route or the like is adjusted automatically, and the adjustment hitherto depending on the user's own adjustment is replaced only by the user's manipulation for starting automatic adjustment.

Also in the invention, by calculating the sum of sampling values of video signals in each frame and minimizing the fluctuations of values between frames, when connecting a video signal source such as computer and an image display device, correction of phase deviation due to factor in the transmission route or the like is adjusted automatically, and the adjustment hitherto depending on the user's own adjustment is replaced only by the user's manipulation for starting the control of automatic adjustment while observing the still picture.

Moreover, in the invention, the adjustment hitherto depending on the user's own adjustment is done automatically, and automatic adjustment is realized by a very simple and inexpensive constitution.

What is claimed is:

1. A dot clock reproducing method comprising the steps of:

sampling a video signal at a frequency different from a dot clock of the video signal, detecting from the sampled video signal an aliasing frequency component, and sequentially adjusting the frequency of the sampling until the detected aliasing frequency component is eliminated.

2. The dot clock reproducing method of claim 1, further comprising a step of dividing the detected aliasing frequency component of one frame into plural regions.

3. The dot clock reproducing method of claim 2, further comprising a step of sampling the video signal source for delivering an adjusting signal, a step of differentiating the signal after sampling, and a step of adjusting automatically the phase of the dot clock to be reproduced, wherein the number of bits smaller than the number of bits of the signal to be displayed as image is differentiated.

4. The dot clock reproducing method of claim 2, further comprising a step of changing the phase of the dot clock, instead of using the video signal source for delivering an adjusting signal, and a step of determining the optimum clock phase on the basis of the result of repeating the above step plural times.

5. A dot clock reproducing apparatus comprising:

A/D converting means for receiving an adjusting signal from a video signal source, and sampling the adjusting signal to convert it into a digital signal, PLL means for dividing a specified synchronizing signal and generating a dot clock which is provided to the A/D converting means for sampling the adjusting signal, frequency analyzing means for analyzing the frequency of the adjusting signal from the output of the A/D converting means and for detecting an aliasing frequency component from the output of the A/D converting means, and dividing ratio setting means for controlling a dividing ratio of the PLL means from the output of the frequency analyzing means including the detection of an aliasing frequency component, whereby the dot clock generated by the PLL means is adjusted to eliminate the aliasing frequency component.

6. A dot clock reproducing apparatus comprising:

A/D converting means for receiving a video signal delivered from a video signal source, and sampling this video signal to convert into a digital signal, PLL means for dividing a specified synchronizing signal and generating a sampling clock for the A/D converting means, signal level difference detecting means for determining the difference between specified samples according to the output of the A/D converting means, accumulating means for determining the absolute value of the output of the signal level difference detecting means, sequentially accumulating the absolute values, and delivering the result of accumulation, and phase adjusting means for controlling the phase of the sampling clock of the PLL means from the output of the accumulating means, wherein the dot clock is reproduced so that the output of the PLL means may be used as the dot clock signal.

7. A dot clock reproducing apparatus comprising:

analog/digital converter for receiving an analog adjusting signal from a video signal source, and converting the analog signal into a digital signal, a PLL circuit providing a sampling clock to the analog/digital converter, frequency analyzing means for detecting an aliasing frequency component, occurring when converting from the analog signal to the digital signal, caused by the sampling clock from the PLL circuit being different from a dot clock of the adjusting signal, a dividing ratio setting circuit for providing a dividing ratio to the PLL circuit depending on the aliasing frequency component output from the frequency analyzing means, and thereby causing the sampling clock provided by the PLL circuit to be matched with the dot clock of the adjusting signal.

8. The dot clock reproducing apparatus of claim 7, further comprising phase adjusting means, and detecting means for detecting a signal level difference between digital signals.

9. A dot clock reproducing apparatus for providing a dot clock depending on an adjusting signal from a video signal source, the dot clock reproducing apparatus comprising means for automatically adjusting a phase of the dot clock based on detecting a sampling value difference between adjusting signals of the video signal source which have been converted from an analog signal to a digital signal.

10. A dot clock reproducing apparatus comprising:

an A/D converter for receiving adjusting signals from a video signal source, and converting the adjusting signals into digital signals, a PLL circuit providing a sampling clock to the A/D converter, detecting means for detecting the signal level difference between digital signals, phase adjusting means for adjusting the phase of the sampling clock of the PLL circuit so that signal level difference between digital signals detected by the detecting means is maximum, and thereby causing the sampling clock of the PLL circuit to be matched to a dot clock of the adjusting signals from the video signal source.

11. A dot clock reproducing method comprising:

a step of sampling an input video signal by a clock at a constant frequency, a step of cumulatively adding sampling data of one frame, and determining the standard deviation of the sum of several frames, and a step of adjusting the phases of the dot clock and the input video signal so that the deviation may be small.

12. A dot clock reproducing apparatus comprising:

an A/D converter for converting an input video signal into a digital signal, an adder for cumulatively adding the output data of the A/D converter, latch means for delivering the output of the adder at a vertical synchronizing rate, calculating means for receiving the output of the latch means, determining the standard deviation of outputs of the latch means for several frames, and delivering the value, a PLL circuit for generating a dot clock on the basis of a horizontal synchronizing signal of the input video signal, and phase adjusting means for adjusting the phase of the dot clock of the output of the PLL circuit depending on the output signal of the calculating means.

13. A dot clock reproducing method, comprising:

a step of sampling an input signal by a dot clock to be reproduced, a step of accumulating the absolute value of the difference of sample values between adjacent samples, and a step of automatically adjusting the phase of the dot clock by using the cumulative result.

14. A dot clock reproducing method of claim 13, wherein the absolute value is not accumulated if smaller than a set value.

15. A dot clock reproducing method of claim 14, wherein the phase of the dot clock is adjusted automatically by determining the average per pixel of the cumulative result.

16. A dot clock reproducing apparatus, comprising:

an A/D converter for converting an input signal into a digital signal, using the dot clock as the sampling clock, a latch circuit for delaying the digital signal after A/D conversion by the period of one sample, a differential circuit for delivering the difference of the output of the latch circuit and the output of the A/D converter, an absolute value circuit for delivering the absolute value of the output of the differential circuit, a cumulative circuit for sequentially accumulating the outputs of the absolute value circuit, and a control circuit for receiving the cumulative result delivered by the cumulative circuit, and controlling the phase of the dot clock.

17. A dot clock reproducing apparatus of claim 16, further comprising a memory circuit for storing the set value, and a comparator for comparing the output of the absolute value circuit and the set value stored in the memory circuit, and delivering an enable signal to the cumulative circuit when the absolute value is greater than the set value.

18. A dot clock reproducing apparatus of claim 17, further comprising a counter for counting the dot clock in the enable period of the enable signal being delivered, and a divider for dividing the output of the cumulative circuit by the output of the counter, and delivering to the control circuit.

19. A dot clock reproducing method comprising:

a step of sampling an input signal by a dot clock to be reproduced, a step of accumulating the absolute value of the difference of sample values between lines, and a step of automatically adjusting the phase of the dot clock by using the result.

20. A dot clock reproducing method of claim 19, wherein the absolute value is not accumulated when greater than the set value.

21. A dot clock reproducing method of claim 20, wherein the phase of dot clock is adjusted automatically by counting the accumulated number of pixels and using the result of accumulating the counting value.

22. A dot clock reproducing apparatus comprising:

an A/D converter for converting an input signal into a digital signal, using the dot clock as the sampling clock, a line memory for delaying the digital signal after A/D conversion by the period of one line, a differential circuit for delivering the difference of the output of the line memory and the output of the A/D converter, an absolute value circuit for delivering the absolute value of the output of the differential circuit, a cumulative circuit for sequentially accumulating the outputs of the absolute value circuit, and a control circuit for receiving the cumulative result delivered by the cumulative circuit, and controlling the phase of the dot clock.

23. A dot clock reproducing apparatus of claim 22, further comprising a memory circuit for storing the set value, and a comparator for comparing the output of the absolute value circuit and the set value stored in the memory circuit, and delivering an enable signal to the cumulative circuit when the absolute value is smaller than the set value.

24. A dot clock reproducing apparatus of claim 23, further comprising a counter for counting the dot clock in the enable period of the enable signal delivered by the comparator, and delivering to the control circuit.

25. A dot clock reproducing method comprising:

a step of sampling an input signal by a dot clock to be reproduced, a step of accumulating the absolute value of the difference of sample values between frames, and a step of automatically adjusting the phase of the dot clock by using the result.

26. A dot clock reproducing apparatus comprising:

an A/D converter for converting an input signal into a digital signal, using the dot clock as the sampling clock, a frame memory for delaying the digital signal after A/D conversion by the period of one frame, a differential circuit for delivering the difference of the output of the frame memory and the output of the A/D converter, an absolute value circuit for delivering the absolute value of the output of the differential circuit, a cumulative circuit for sequentially accumulating the outputs of the absolute value circuit, and a control circuit for receiving the cumulative result by the cumulative circuit, and controlling the phase of the dot clock.

* * * * *

UNITED STATES PATENT AND TRADE MARK OFFICE

CERTIFICATE OF CORRECTION

PATENT NO. : 5,940,136
DATED : August 17, 1999
INVENTOR(S) : Abe et al.

It is certified that error appears in the above-identified patent and that said Letters Patent is hereby corrected as shown below:

Cover page, insert item
--[30] Foreign Application Priority Data
May 7, 1996 [JP] Japan 8-112476
March 6, 1997 [JP] Japan 9- 51306--

Column 16, claim 7, line 43, insert --an-- before "analog/digital".

Column 20, claim 26, line 3, after "result" insert --delivered--.

Signed and Sealed this

Twenty-fourth Day of April, 2001

Attest:

NICHOLAS P. GODICI

*Attesting Officer* *Acting Director of the United States Patent and Trademark Office*